(12) United States Patent
Li et al.

(10) Patent No.: US 11,613,201 B2
(45) Date of Patent: Mar. 28, 2023

(54) AUTOMATIC HIGH BEAM CONTROL FOR AUTONOMOUS MACHINE APPLICATIONS

(71) Applicant: NVIDIA Corporation, Santa Clara, CA (US)

(72) Inventors: Jincheng Li, Los Altos, CA (US); Minwoo Park, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 381 days.

(21) Appl. No.: 16/991,242

(22) Filed: Aug. 12, 2020

(65) Prior Publication Data

US 2021/0046861 A1 Feb. 18, 2021

Related U.S. Application Data

(60) Provisional application No. 62/885,774, filed on Aug. 12, 2019.

(51) Int. Cl.
*H05B 45/10* (2020.01)
*B60Q 1/14* (2006.01)
(Continued)

(52) U.S. Cl.
CPC ............. *B60Q 1/143* (2013.01); *B60Q 1/076* (2013.01); *G06K 9/6278* (2013.01); *G06V 20/56* (2022.01);
(Continued)

(58) Field of Classification Search
CPC .... B60Q 1/143; B60Q 1/076; B60Q 2300/41; B60Q 2300/42; B60Q 2300/45;
(Continued)

(56) References Cited

U.S. PATENT DOCUMENTS 10,298,910 B1 * 5/2019 Kroeger .................. G06T 11/60
10,345,437 B1 * 7/2019 Russell ................ G06K 9/6267
(Continued)

FOREIGN PATENT DOCUMENTS

WO 2004/076231 A2 9/2004

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Minh D A
(74) *Attorney, Agent, or Firm* — Taylor English Duma L.L.P.

(57) ABSTRACT

In various examples, high beam control for vehicles may be automated using a deep neural network (DNN) that processes sensor data received from vehicle sensors. The DNN may process the sensor data to output pixel-level semantic segmentation masks in order to differentiate actionable objects (e.g., vehicles with front or back lights lit, bicyclists, or pedestrians) from other objects (e.g., parked vehicles). Resulting segmentation masks output by the DNN(s), when combined with one or more post processing steps, may be used to generate masks for automated high beam on/off activation and/or dimming or shading—thereby providing additional illumination of an environment for the driver while controlling downstream effects of high beam glare for active vehicles.

20 Claims, 16 Drawing Sheets

(51) Int. Cl.
*G06K 9/62* (2022.01)
*H05B 47/125* (2020.01)
*B60Q 1/076* (2006.01)
*G06V 20/56* (2022.01)

(52) U.S. Cl.
CPC ........... *H05B 45/10* (2020.01); *H05B 47/125* (2020.01); *B60Q 2300/41* (2013.01); *B60Q 2300/42* (2013.01); *B60Q 2300/45* (2013.01)

(58) Field of Classification Search
CPC ........... B60Q 2300/056; G06K 9/6278; G06K 9/6271; G06V 20/56; G06V 10/141; G06V 10/30; G06V 10/82; G06V 20/58; G06V 20/584; G06V 20/695; H05B 45/10; H05B 47/125; G06T 7/11; G06T 7/174; G06T 2207/10016; G06T 2207/20081; G06T 2207/20084; G06T 2207/20182; G06T 2207/30252; G06N 3/0445; G06N 3/0472; G06N 5/003; G06N 20/10; G06N 20/20; G06N 3/0454; G06N 3/08; G06N 7/005; H04N 19/70; Y02B 20/40
See application file for complete search history.

(56) References Cited

U.S. PATENT DOCUMENTS

| | | | |
|---|---|---|---|
| 10,345,447 B1* | 7/2019 | Hicks | G01S 7/4863 |
| 10,885,698 B2 | 1/2021 | Muthler et al. | |
| 2004/0143380 A1 | 7/2004 | Stam et al. | |
| 2008/0294315 A1 | 11/2008 | Breed | |
| 2017/0286774 A1* | 10/2017 | Gaidon | G06V 10/10 |
| 2019/0180502 A1* | 6/2019 | Englard | G06K 9/6262 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

International Preliminary Report on Patentability received for PCT Application No. PCT/US2020/045888, dated Feb. 24, 2022, 8 pages.

Garcia, A.G., et al.,"A Survey on Deep Learning Techniques for Image and Video Semantic Segmentation", Applied Soft Computing, vol. 70, XP05568102, pp. 41-65 (2018). DOI:10.1016/j.asoc. 2018.05.018.

Marinas, J., et al.,"Detection and Tracking of Traffic Signs Using a Recursive Bayesian Decision Framework", 14th International IEEE Conference on Intelligent Transportation Systems Washington, DC, USA., XP032023300, pp. 1942-1947 (Oct. 5-7, 2011).

Zhu, Q., et al.,"A Novel Recursive Bayesian Learning-Based Method for the Efficient and Accurate Segmentation of Video With Dynamic Background" IEEE Transactions on Image Processing, vol. 21, No. 9, XP011492152, pp. 3865-3876 (Sep. 2012).

International Search Report and Written Opinion received for PCT Patent Application No. PCT/US2020/045888, dated Nov. 16, 2020, 11 pages.

* cited by examiner

AUTOMATIC HIGH BEAM CONTROL FOR AUTONOMOUS MACHINE APPLICATIONS

CROSS-REFERENCE TO RELATED APPLICATIONS

This application claims the benefit of U.S. Provisional Application No. 62/885,774, filed on Aug. 12, 2019, which is hereby incorporated by reference in its entirety.

BACKGROUND

Most modern passenger vehicles have at least two types of headlights—low beams and high beams. Low beams on such vehicles may, for example, provide visibility of up to 50 to 60 meters in front of the vehicle, while high beams may provide visibility up to 200 meters or more. High beam control is crucial for driving safely during evening hours and in other low-light conditions—e.g., tunnels and underpasses—particularly when traveling at high speeds in rural areas. Well-illuminated regions of the environment help drivers identify obstacles, pedestrians, and/or other vehicles in their path early enough to respond safely to avoid accidents and/or to avoid executing uncomfortable maneuvers. At the same time, the emission and/or glare produced from high intensity lights can be uncomfortable and may even present a danger to other actors in the environment (e.g., oncoming and/or closely-leading vehicles, bicyclists, cyclists, pedestrians, etc.). As such, different techniques have been implemented to avoid these unsafe conditions— such as dimming high beam illumination or even turning off high beams completely in areas when other road users are present and/or when certain conditions are present (e.g., well-illuminated and/or urban areas, days with precipitation, etc.).

For example, some conventional systems use manual high beam control where a driver manually activates or deactivates the high beams using an input signal or switch. However, distracted drivers may forget their high beams are activated when passing an oncoming vehicle or approaching a leading vehicle from the rear, or may not notice an oncoming actor until the high beams have already caused visual impairment thereto. Other conventional systems have implemented automatic beam control using conventional image processing technologies—e.g., detecting sets of high lux pixels in certain areas of an input camera frame. For example, some systems may use light source analysis to detect an approaching or closely leading vehicle and, if certain pixels have a brightness above a certain threshold, may deactivate the currently activated high beams. However, such conventional image processing technologies used in this manner can be inaccurate and activation and/or deactivation of the high beams may be inconsistently applied. For example, street lights or other illumination sources may be detected that cause the high beams to be deactivated, even though an oncoming actor or closely leading actor are not the cause of the illumination. As a result, high beams may be deactivated when unnecessary, thereby leading to less safe driving conditions for an ego-vehicle.

SUMMARY

Embodiments of the present disclosure relate to automatic high beam control for autonomous machine applications. Systems and methods are disclosed that use one or more deep neural networks (DNNs) to automate high beam control for vehicles—such as cars, trucks, SUVs, boats, flying vessels, or other self-propelled objects. For example, DNN-based image processing using pixel-level semantic segmentation of images received from cameras and/or sensors on the vehicles, combined with one or more post-processing techniques, may be used to adjust control and/or activation parameters (hereinafter "control parameters") of high beams of a vehicle—such as to turn the high beams on or off, and/or to dim, shade, brighten, and/or otherwise adjust an illumination level or setting of the high beams.

In contrast to conventional systems, such as those described above, the systems and methods of the present disclosure may use the DNNs to perform pixel-level semantic segmentation in order to differentiate active vehicles (those vehicles with front or back lights lit), pedestrians, cyclists, and/or other actionable actors (e.g., actors for whom high beam control parameters should be changed) from stationary vehicles, background objects, and/or other actors or objects that are not actionable (e.g., do not correspond to an adjustment of current high beam control parameters). The segmentation masks output by the DNN(s), when combined with one or more post processing steps (e.g., recursive Bayesian filtering, temporal filtering, and/or other techniques), may result in accurate identification and localization of actionable actors such that high beam on/off activations and/or dimming or shading during activation may be effectively automated—thereby providing additional illumination of the environment (e.g., for a driver and/or for more informative, well-illuminated sensor data capture for various operations of advanced driver assistance systems (ADAS) and/or autonomous driving software stacks) while also controlling the downstream effect of the high beam activations for actors in the environment. For example, where the high beams include light emitting diode (LED) lighting configurations, light emitted from a high beam LED light configuration may be selectively brightened, dimmed (e.g., by area, quadrant, row, column, etc.), activated, deactivated, and/or the like. In some embodiments, the control of the high beams may differ depending on the lighting configurations of the vehicle and/or the region or country of operation (e.g., based on lighting requirements enforced on vehicle manufacturers in a specific region).

BRIEF DESCRIPTION OF THE DRAWINGS

The present systems and methods for automatic high beam control for autonomous machine applications are described in detail below with reference to the attached drawing figures, wherein.

DETAILED DESCRIPTION

Figure 1A:
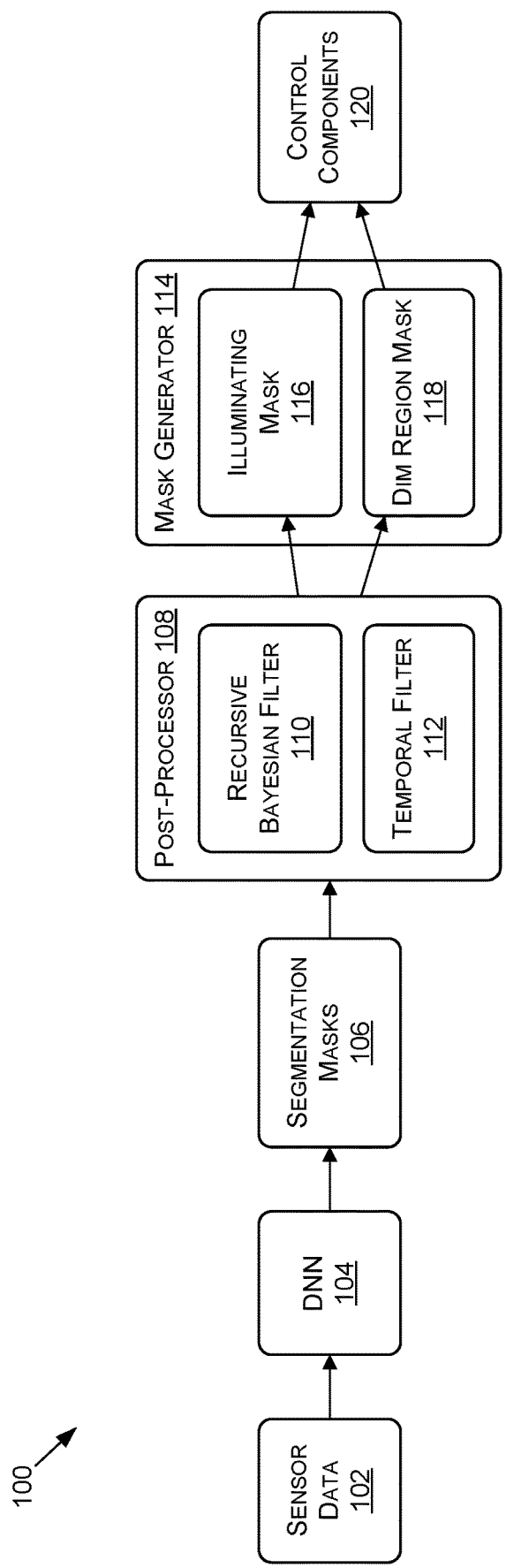
FIG. 1A is a data flow diagram illustrating an example process for automatic high beam control using a deep neural network (DNN), in accordance with some embodiments of the present disclosure.

Systems and methods are disclosed related to automatic high beam control for autonomous machine applications. Although the present disclosure may be described with respect to an example autonomous vehicle 900 (alternatively referred to herein as "vehicle 900" or "ego-vehicle 900," an example of which is described herein with respect to FIGS. 9A-9D), this is not intended to be limiting. For example, the systems and methods described herein may be used by non-autonomous vehicles, semi-autonomous vehicles (e.g., in adaptive driver assistance systems (ADAS)), robots, warehouse vehicles, off-road vehicles, flying vessels, boats, a passenger vehicle, a car, a truck, a bus, a first responder vehicle, a shuttle, an electric or motorized bicycle, a motorcycle, a fire truck, a police vehicle, an ambulance, a construction vehicle, an underwater craft, a drone, and/or another type of vehicle (e.g., that is unmanned and/or that accommodates one or more passengers). In addition, although the present disclosure may be described with respect to autonomous driving, this is not intended to be limiting. For example, the systems and methods described herein may be used in robotics, aerial systems, boating systems, other technology areas where high beams lighting configurations are implemented, and/or simulation performed for any such applications or technology areas.

In contrast to conventional systems, such as those described herein, the system of the present disclosure requires no human intervention and provides the ability to accurately extract features—such as an active car with its lights on—to adjust high beam control parameters and to avoid momentary visual impairment of others in the environment. According to one or more embodiments of the present disclosure, performing autonomous beam control may be accomplished using data from an image sensor, a deep neural network (DNN) for processing image data generated using the image sensor, and a beam configuration (e.g., a high beam headlight configuration) including a controller for operating control parameters or settings of the beam configuration. The image sensor may be a camera of any type, such as any of the cameras described herein with respect to the vehicle 900.

The beam configuration may include one or more high beam headlights operable to turn off and turn on, to be selectively dimmed or brightened, and/or to have a pose corresponding thereto adjusted (e.g., by actuating the high beams using one or more motors). Some embodiments of the beam configuration may include an array or matrix of beam light emitting diodes (LEDs) independently dimmable or independently operable to be selectively turned off or on. Additionally or alternatively, some embodiments of the beam configuration may include motors configured and operable for actuating at least one high beam light or one low beam light of the beam configuration. For example, the motor may selectively pivot the at least one high beam light to shine further left, further right, further up, further down, or a combination thereof.

The DNN(s) may be trained using ground truth data generated from annotations of training images. For example, the training images may be labeled with bounding shapes for identifying pixels of the training images that correspond to various different object or actor types (e.g., active vehicles, pedestrians, cyclists, and/or other actionable actors, and/or to parked/inactive vehicles). In some embodiments, the bounding shapes may be separately labeled to indicate vehicle lights as either ON or OFF, in addition to semantic class labels. This information may be used to train the system as to which actors cause an update to the high beam control parameters. The training can also be customized for different countries or regions to conform to regulations in that country or region, regarding when high beams should be on or off, dimmed or brightened, etc.

According to some embodiments, the DNN may be trained to output a confidence mask at each pixel for each class, which may (for example and without limitation) be expressed as any of a sigmoid(x) function, a step function, a linear function, hyperbolic tangent function, rectified linear unit (ReLU) function, and/or other function types, or any combination thereof. For example and without limitation, each class can be represented as a binary mask encoded using a sigmoid function indicating confidence in a range (e.g., 0, 1) that a pixel belongs to certain class. Different classes may have different segmentation masks and the ground truth annotations corresponding thereto may be visualized using different colors, patterns, or otherwise differentiated using other image processing or labeling methods.

Once trained to output segmentation masks corresponding to any number of different classes of the DNN, the resulting outputs may include noise. To deal with this resulting noise present in the segmentation mask output, various post-processing techniques may be used. For example, the post-processing may include temporal post-processing and/or spatial post-processing. The temporal post-processing may include, as an example, maintaining N frame results to reject outliers for a smoother result. Other hysteresis gating techniques and single-frame post-processing using a maximum likelihood estimation (MLE) may additionally or alternatively be applied. In some embodiments, spatial post-processing may additionally or alternatively be applied to overcome the image-processing noise and thereby boost performance. For example, a spatial filter—such as recursive Bayesian filter—may be applied to the segmentation masks output by the DNNs to weight confidence values recursively across frames. For example, the recursive Bayesian filter may receive input from the segmentation mask classifying pixels and also from a prior segmentation mask classifying pixels of a prior image, where the prior segmentation mask was also weighted based on another prior segmentation mask, and so on, in a recursive manner.

After the segmentation masks are output, and/or after post-processing, an illuminating mask for certain classes may be defined, such as by generating 2D mapping from the camera location to the high beam mounting location to ensure the illumination masks or shadows correspond to the correct locations in the environment. Based on the illuminating mask, control signals for the high beams may be sent to a controller of the high beams. For traditional high beams, this may simply turn the high beams on or off automatically depending on detection of an active vehicle or other active object of interest and/or its estimated proximity based on the image processing described above. However, for light emitted from a high beam LED light configuration, the control signal can command various ones of the LEDs to be selectively brightened or dimmed (or turned off) by region using one or more microcontrollers. In an adaptive driving beam (ADB) configuration, some LEDs in an array of LEDs may be turned off or otherwise blocked to create a shadow on an area in front of the high beams where an active vehicle or other actionable object was detected. Once the active vehicle or other actionable object is no longer detected, all of the LEDs in the array of LEDs may be turned back on or no longer blocked. In some configurations, even if arrays of LEDs are not used, other techniques (e.g., motors for repositioning of lights, etc.) may be used to create shadows or lower illumination levels over desired areas or regions of an environment to the front or side of the vehicle or to otherwise automatically control when and where the high beam light shines.

As a result of using the techniques for image-processing and high beam control described herein, the driver or passengers (e.g., of a semi- or fully-autonomous vehicle) is provided autonomous high beam control such that manually turning off and on the high beams is not required. Advantageously, no human intervention may be required, and the system may accurately adjust the high beam control parameters to avoid momentary visual impairment of others in the environment—thereby increasing the safety of the system for both the ego-vehicle and other actors in the environment.

Automatic High Beam Control Using a DNN

Now referring to FIG. 1A, FIG. 1A is a data flow diagram illustrating an example process 100 for automatic high beam control using a machine learning model (e.g., a DNN), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, features, functionality, and/or components described with respect to FIG. 1 may be similar to those of autonomous vehicle 900 of FIGS. 9A-9D and/or example computing device 1000 of FIG. 10.

At a high level, the process 100 may include one or more deep neural networks (DNNs) 104 receiving one or more inputs, such as sensor data 102, and generating one or more outputs, such as segmentation masks 106. The sensor data 102 may be generated by one or more cameras of an autonomous vehicle (e.g., vehicle 900, as described herein at least with respect to FIGS. 9A-9D). In some embodiments, the sensor data 102 may additionally or alternatively include other types of sensor data, such as LiDAR data from one or more LiDAR sensors 964, RADAR data from one or more RADAR sensors 960, audio data from one or more microphones 996, etc. The DNN(s) 104 may be trained to generate the segmentation masks 106 that may be used to control high beam lighting activations of the vehicle 900. For example, with respect to the vehicle 900, control components 120 may be used to aid the autonomous vehicle 900 in performing one or more operations—such as on/off control of lights, dimming/brightening of lights, actuation of light motors, etc.).

In some embodiments, the sensor data 102 may include data representative of images of a field of view of one or more cameras of a vehicle, such as stereo camera(s) 968, wide-view camera(s) 970 (e.g., fisheye cameras), infrared camera(s) 972, surround camera(s) 974 (e.g., 360 degree cameras), long-range and/or mid-range camera(s) 998, and/or other camera type of the autonomous vehicle 900 (FIGS. 9A-9D). In some examples, the sensor data 102 may be captured by a single camera with a forward-facing, substantially centered field of view with respect to a horizontal axis (e.g., left to right) of the vehicle 900. In a non-limiting embodiment, one or more forward-facing cameras may be used (e.g., a center or near-center mounted camera(s)), such as a wide-view camera 970, a surround camera 974, a stereo camera 968, and/or a long-range or mid-range camera 998. The sensor data 102 captured from this perspective may be useful for predictions described herein because a forward-facing camera may include a field of view (e.g., the field of view of the forward-facing stereo camera 968 and/or the wide-view camera 970 of FIG. 9B) that includes both a current lane of travel of the vehicle 900, adjacent lane(s) of travel of the vehicle 900, lanes for oncoming traffic, and/or boundaries of the driving surface. In some examples, more than one camera or other sensor (e.g., LiDAR sensor, RADAR sensor, etc.) may be used to incorporate multiple fields of view or sensory fields (e.g., the fields of view of the long-range cameras 998, the forward-facing stereo camera 968, and/or the forward-facing wide-view camera 970 of FIG. 9B).

In some examples, the sensor data 102 may be captured in one format (e.g., RCCB, RCCC, RBGC, etc.), and then converted (e.g., during pre-processing of the sensor data) to another format. In some other examples, the sensor data 102 may be provided as input to a sensor data or image data pre-processor (not shown) to generate pre-processed image data. Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format (e.g., H.264/Advanced Video Coding (AVC), H.265/High Efficiency Video Coding (HEVC), VP8, VP9, Alliance for Open Media Video 1 (AV1), Versatile Video Coding (VVC), or any other video compression standard), raw images such as originating from Red Clear Blue (RCCB), Red Clear (RCCC) or other type of imaging sensor. In some examples, different formats and/or resolutions could be used for training the DNN(s) 104 than for inferencing (e.g., during deployment of the DNN(s) 104 in the autonomous vehicle 900).

A sensor data or image data pre-processor may use data representative of one or more images (or other data representations, such as LiDAR depth maps) and load the sensor data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. In some embodiments, batching may be used for training and/or for inference. In such examples, the batch size B may be used as a dimension (e.g., an additional fourth dimension). Thus, the input tensor may represent an array of dimension W×H×C×B. Any ordering of the dimensions may be possible, which may depend on the particular hardware and software used to implement the sensor data or image data pre-processor. This ordering may be chosen to maximize training and/or inference performance of the DNN(s) 104.

In some embodiments, a pre-processing image pipeline may be employed by the sensor data or image data pre-processor to process a raw image(s) acquired by a sensor(s) (e.g., camera(s)) and included in the sensor data 102 to produce pre-processed image data or sensor data which may represent an input image(s) to the input layer(s) (e.g., feature extraction layers) of the DNN(s) 104. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the image data pre-processor, it may include bilateral denoising in the Bayer domain. Where demosaicing is employed by the image data pre-processor, it may include bilinear interpolation. Where histogram computing is employed by the sensor data or image data pre-processor, it may involve computing a histogram for the C channel, and may be merged with the decompanding or noise reduction in some examples. Where adaptive global tone mapping is employed by the sensor data or image data pre-processor, it may include performing an adaptive gamma-log transform. This may include calculating a histogram, getting a mid-tone level, and/or estimating a maximum luminance with the mid-tone level.

As such, the DNN(s) 104 may use one or more images or other data representations (e.g., point clouds from LiDAR data or RADAR data, range images from LiDAR data, etc.) as represented by the sensor data 102 as input to generate the segmentation mask(s) 106. In a non-limiting example, the DNN(s) 104 may process an image(s) represented by the sensor data 102 to generate the segmentation masks 106, the segmentation masks 106 may be processed using a post-processor 108, and the post-processed data may be used by a mask generator 114 to generate an illuminating mask 116 and/or a dim region mask 118 for controlling—e.g., via control components 120—the activation of high beams of the vehicle 900. In an example non-limiting embodiment, the size of an input resolution of the DNN(s) 104 may be 480×302×3, and the size of the output resolution may be 120×76×a number of classes. Since the output of the DNN, in some example embodiments, has a fairly small resolution (e.g., only 120×76×3), estimation may be done independently at each pixel location for simplicity. This estimation can be performed using parallel processors and parallel processing techniques for further optimization. For example, one or more parallel processing units may be employed to increase efficiency of the system while also reducing run time in order to enable near real-time or real-time deployment of the system.

Although examples are described herein with respect to using CNNs as the DNN(s) 104, this is not intended to be limiting. For example and without limitation, the DNN(s) 104 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In some embodiments, the DNN(s) 104 may include an encoder-decoder architecture. For example, as illustrated by the DNN 104A of FIG. 1B, the DNN 104A may include an encoder-decoder framework that processes the sensor data 102 and outputs the data corresponding to the segmentation masks 106. For example, an intermediate representation of "blobs" predicted at per-pixel level may shrink the gap between a frame of sensor data 102 input to the DNN 104A and an individual bit of an output vector corresponding to the segmentation masks 106.

As such, in some embodiments, the DNN(s) may include a trunk (or stream of layers) with one or more heads (or at least partially discrete streams of layers) for predicting outputs based on the sensor data 102. For example, the DNN(s) 104 may include, without limitation, a feature extractor (e.g., a DNN, an encoder/decoder, etc.) including convolutional layers, pooling layers, and/or other layer types, where the output of the feature extractor is provided as input to one or more heads to predict different outputs. In the example of FIG. 1A, the DNN(s) 104 is illustrated with an example architecture that extracts features from the sensor data 102 and executes class or semantic segmentation on the extracted features. More specifically, the DNN(s) 104 of FIG. 1A may include an encoder/decoder trunk and a deconvolutional head that may be used to output class confidences via one or more segmentation masks 106.

Figure 1B:
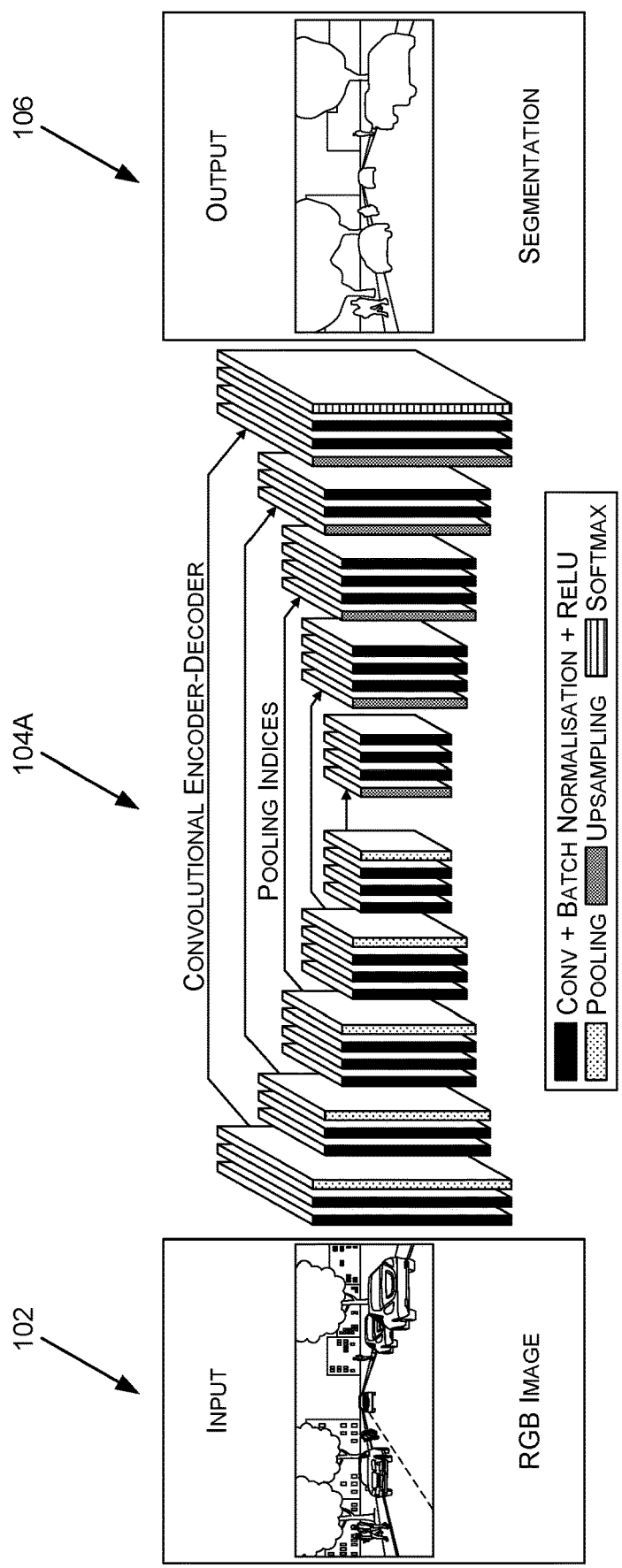
FIG. 1B is an example illustration of inputs and outputs of a DNN, in accordance with some embodiments of the present disclosure.

The encoder/decoder trunk may be implemented using encoder and decoder components with skip connections (e.g., similar to a Feature Pyramid Network, U-Net, etc.), in embodiments. For example, the encoder/decoder trunk may accept the sensor data 102 (e.g., an image and/or an input tensor) and apply various convolutions, pooling, and/or other types of operations to extract features into some latent space. In FIG. 1B, the encoder/decoder trunk is illustrated with an example implementation involving an encoding (contracting) path from left to right, followed by an example decoding (expansive) path from the end of the encoding path to the right. Along the contracting path, each resolution may include any number of layers (e.g., convolutions, dilated convolutions, inception blocks, etc.) and a downsampling operation (e.g., max pooling). Along the expansive path, each resolution may include any number of layers (e.g., deconvolutions, upsampling followed by convolution(s), and/or other types of operations). In the expansive path, each resolution of a feature map may be upsampled and concatenated (e.g., in the depth dimension) with feature maps of the same resolution from the contracting path. In some examples, corresponding resolutions of the contracting and expansive paths may be connected with skip connections, in embodiments, which may be used to add or concatenate feature maps from corresponding resolutions (e.g., to form a concatenated feature map). As such, the encoder/decoder trunk may extract features into some latent space tensor, which may be input into a class confidence (e.g., deconvolutional) head that may be output the segmentations mask(s) 106.

The class confidence head may include any number of layers (e.g., convolutions, pooling, classifiers such as softmax, and/or other types of operations, etc.) that predict classification data from the outputs of the encoder/decoder trunk. For example, the class confidence head may include a channel (e.g., a stream of layers plus a classifier) for each class of object to be detected (e.g., vehicles, cars, trucks, active vehicles, pedestrians, inactive cars, cyclists, motorbikes, riders, sidewalks, buildings, trees, poles, subclasses thereof, some combination thereof, etc.), such that the class confidence head extracts classification data in any suitable form. For example, the class confidence head may predict a confidence map that represents an inferred confidence level of whether a particular object is present (regardless of class), separate confidence maps for each class, and/or the like. In some embodiments, the class confidence data predicted by the class confidence head may take the form of a multi-channel tensor where each channel may be thought of as a heat map storing classification values (e.g., probability, score, or logit) that each pixel belongs to a class(es) corresponding to the channel.

As such, the DNN(s) 104 may predict multi-channel classification data and/or other output data from a particular input (e.g., the sensor data 102). Some possible training techniques are described in more detail below. In operation, the outputs of the DNN(s) 104 may be decoded (e.g., via post-processing using post-processor 108) to identify locations of detected objects (e.g., pixel locations) and/or semantic class labels for detected objects.

Figure 2:
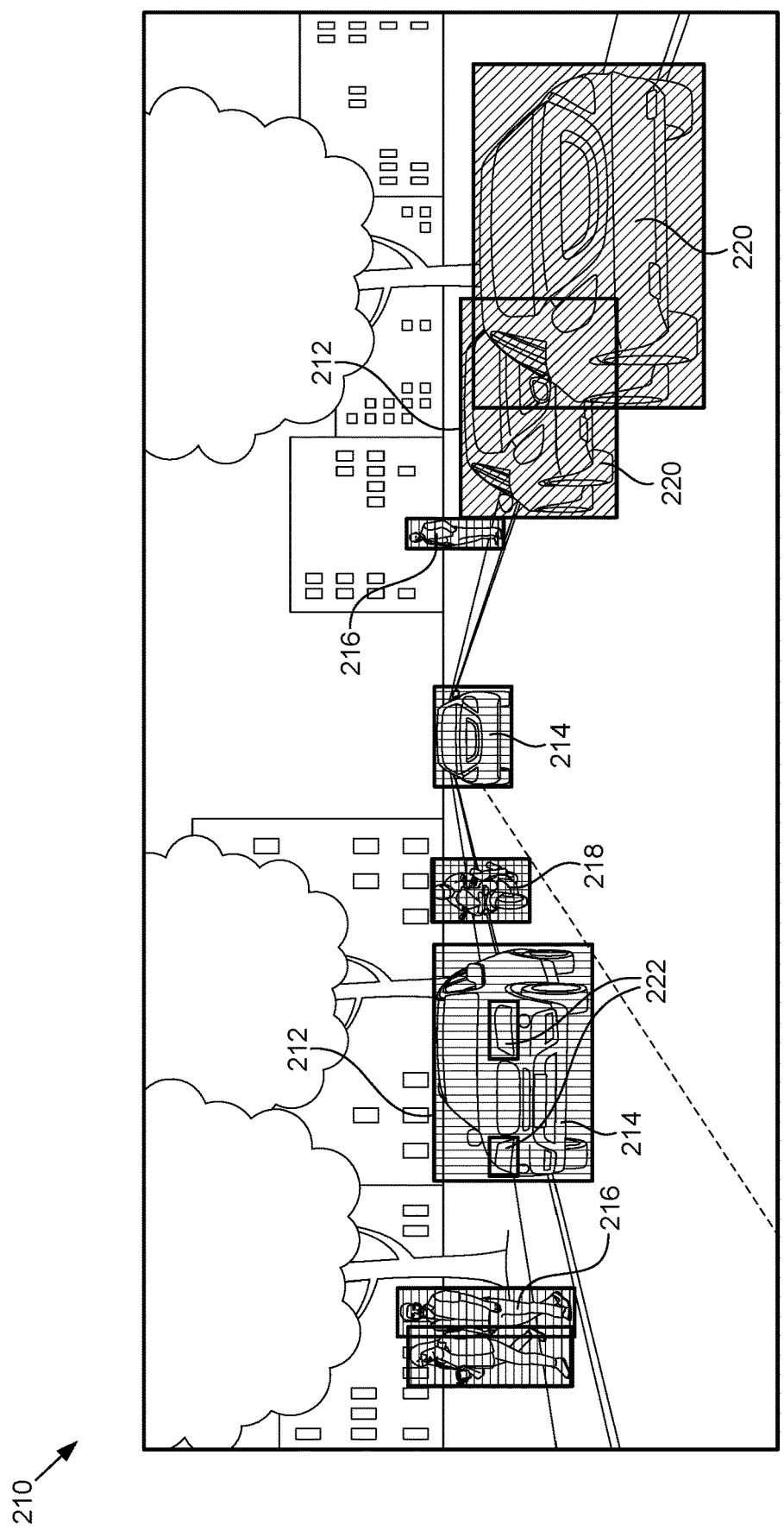
FIG. 2 is an example illustration of a training image for generating ground truth data for training a DNN, in accordance with some embodiments of the present disclosure.

The DNN(s) 104 may be trained using ground truth data generated from annotations of training sensor data (e.g., training image 210, as depicted in FIG. 2, or other sensor data representations such as LiDAR and/or RADAR point clouds, range images, depth maps, etc.). The training sensor data may be labeled with bounding shapes 212 and/or boundary contours for identifying pixels or points of the training sensor data that correspond to various different object or actor types. For example, a labeling process or labeling guidelines may be used to label portions of the training data corresponding to various actors, objects, and/or light sources, and this data may be used to generate ground truth segmentation masks corresponding to active vehicles 214, pedestrians 216, cyclists or riders 218, and/or other actionable actors, and/or to parked/inactive vehicles 220.

In some embodiments, and with respect to FIG. 2, the bounding shapes 212 and/or boundary contours may separately identify vehicle lights 222, and/or may identify the vehicle lights 222 as either ON or OFF, in addition to semantic class labels (such as vehicle, cyclist, and the like). For example, a first bounding shape or contour may be annotated for a vehicle and labeled as "vehicle," and a second bounding shape or contour may be annotated for the vehicle (or lights of the vehicle) and labeled as vehicle lights, and/or a third bounding shape or contour may be labeled as "lights ON" or "lights OFF." In some embodiments, a single bounding shape or contour may include multiple labels, such as "vehicle" and "lights ON" or "lights OFF." In other embodiments, actors or objects may have a single label capturing the object type, light locations, and the light condition, such as "active vehicle" for vehicles with lights on or "inactive vehicle" for vehicles with lights off. Additionally or alternatively, the labeling guidelines may correspond to the high-beams of the ego-vehicle, such that the active vehicles 214 or other items for which lights of the high beam configuration must be dimmed or turned off may be labeled as "high beam off" and other classes not included therein (including inactive vehicles 220) can be labeled as "high beam on."

Figure 4A:
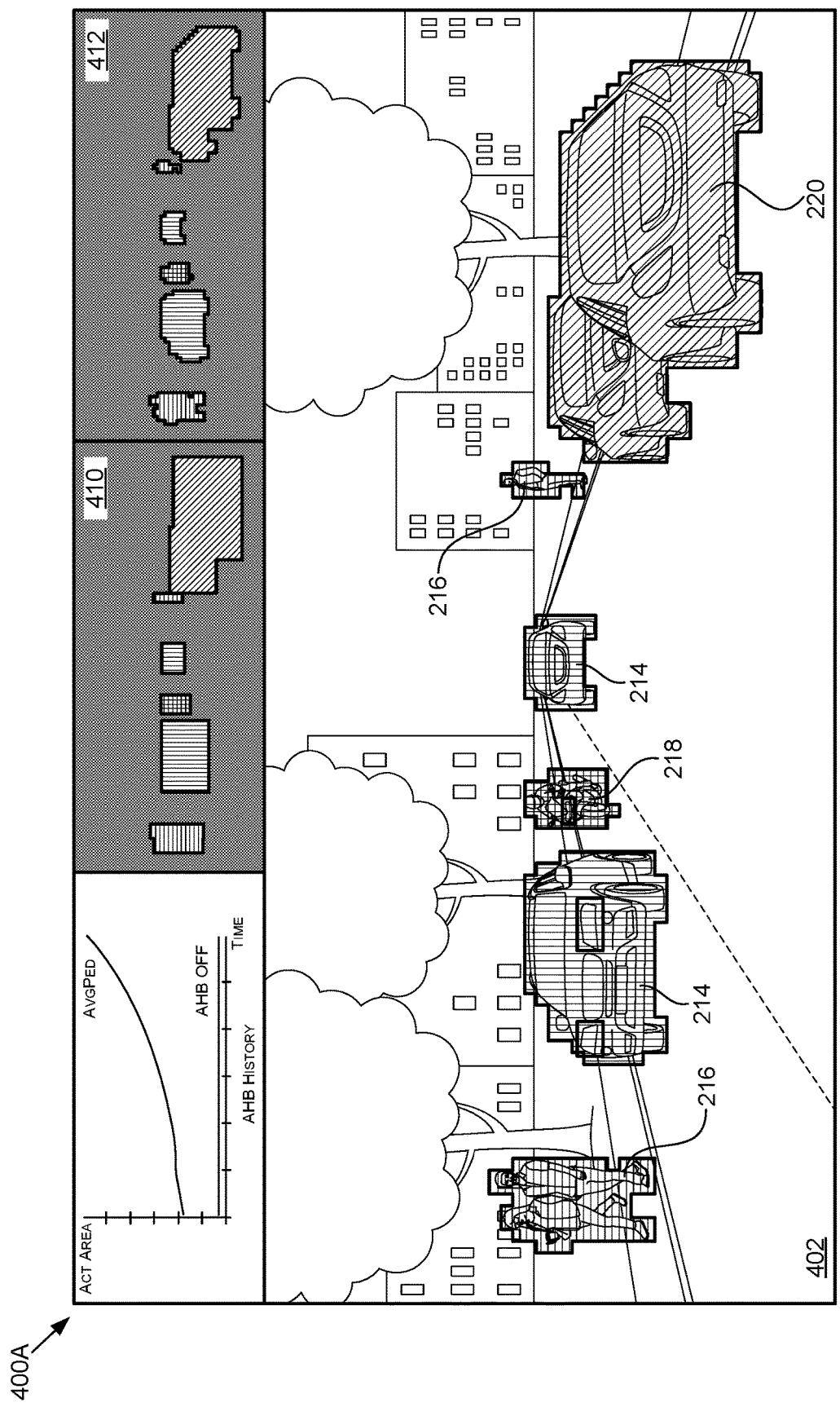
FIG. 4A is an example visualization of a segmentation mask output by a DNN and overlaid onto an image processed by the DNN, in accordance with some embodiments of the present disclosure.
Figure 4B:
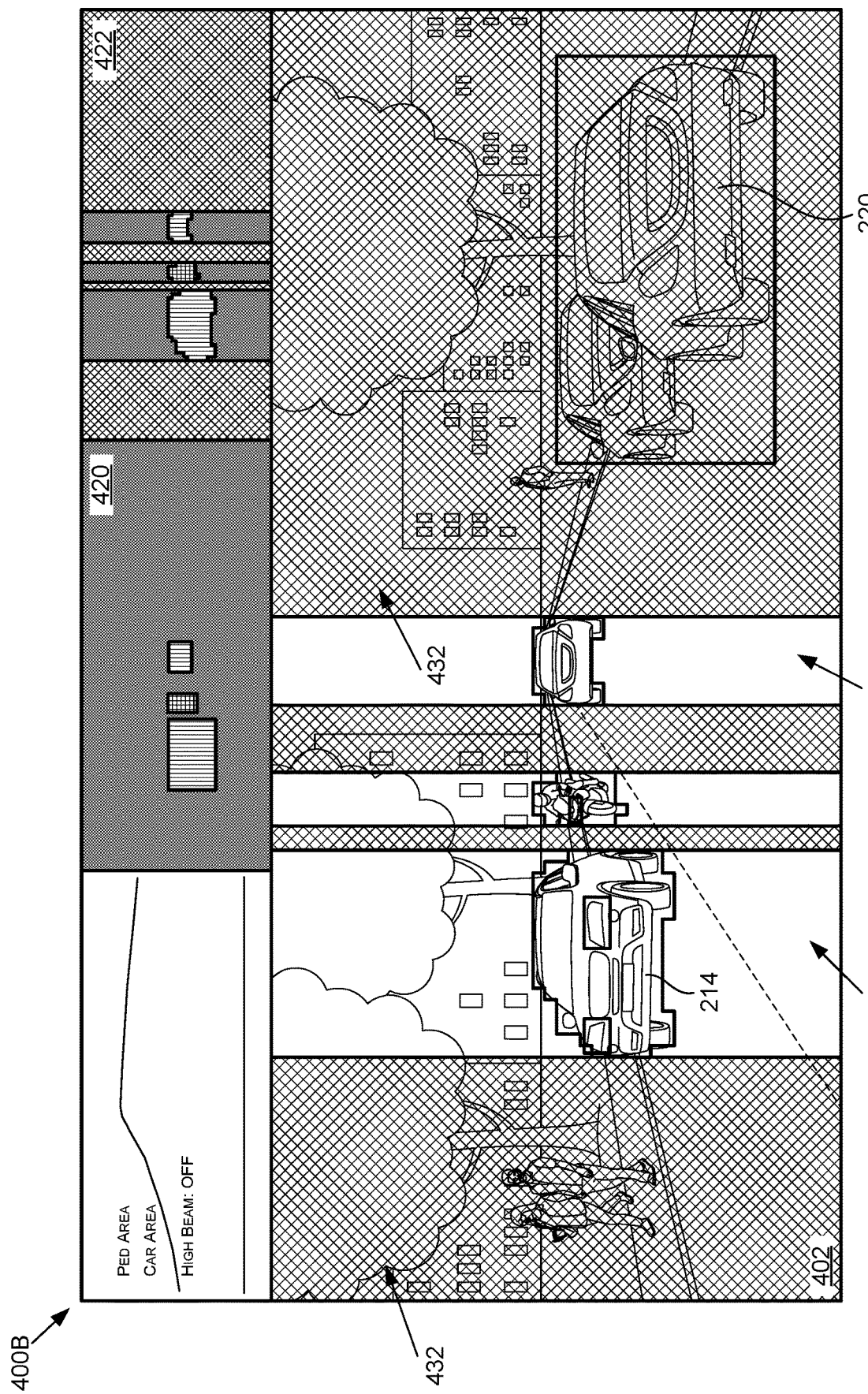
FIG. 4B is an example illustration of a segmentation mask output by a DNN and a high beam illumination mask generated therefrom, in accordance with some embodiments of the present disclosure.

In some embodiments, label fusion techniques may be employed to generate combined label classes. For example, a bike may be labeled, and a bike rider (or cyclist) may be labeled, and fusion may be executed to generate a final label for the bike and the bike rider of "rider." As another example, a car may be labeled, car lights of the car may be labeled, and lights ON may be labeled corresponding to the car and/or the lights. Fusion may then be executed to generate a final label of "active car" for the vehicle. In some embodiments, as described herein, where an active vehicle or other object or actor type only accounts for a small number of pixels in the image (e.g., because the object or actor is further away from the ego-vehicle), mask dilation may be employed to increase the size of the mask corresponding to the object or actor. For example, when using a relatively small resolution (e.g., 120×76×3), each pixel represents a relatively large area in real world space. As a result, remote or distant active vehicles 214 typically occupy relatively fewer pixels and have less relative movement. In some embodiments, where distant vehicles appear in a small number of pixels and are therefore more difficult to detect, labeling may additionally include zooming or dilating the object or the bounding shapes 212 or contour corresponding thereto to facilitate easier detection, as depicted in FIGS. 4A and 4B. For closer active vehicles 214, where pixels typically experience greater inter-frame movement, the output of the DNN 104 may generally be more consistent, and dilation may not be implemented.

In any example, this information may be used to train the DNN(s) 104 as to—or to make the outputs more indicative of—which actors should cause an update to the high beam control parameters. Specifically, vehicles with the vehicle lights 222 on may be labeled as active vehicles 214 (e.g., vehicle and light ON, or active vehicle) and vehicles with the vehicle lights 222 off may be indicated as inactive vehicles 220 (e.g., vehicle and lights OFF, or inactive vehicle). In some embodiments, inactive vehicles may not be labeled, or may be labeled and the DNN(s) 104 may not be trained to predict them. As such, the DNN(s) 104 may only be trained to predict segmentation masks corresponding to actionable actors (e.g., actors for which high beam control may be adjusted). In other embodiments, however, inactive vehicles or other object types (e.g., street lights, house lights, parked motorcycles, racked bicycles, etc.) may be predicted by the DNN(s) 104. These actors or objects may be referred to herein as non-actionable actors, where non-actionable actors may not cause adjustments to the high beam controls. For example, as depicted in FIGS. 4A-4B, inactive vehicles 220 may be ignored by the DNN(s) 104 and do not affect the high beam configuration described herein. This is because, as an example, parked vehicles on the side of the road do not typically require the ego-vehicle 900 to dim or turn off its high beams while driving, whereas active vehicles would generally require dimming or turning off of high beams or masking portions thereof, as later described herein. However, in an example where a parked car has its lights on (and may be preparing to enter traffic), the parked car may be labeled as an "active vehicle" and may be identified in the segmentation mask 106.

Figure 3A:
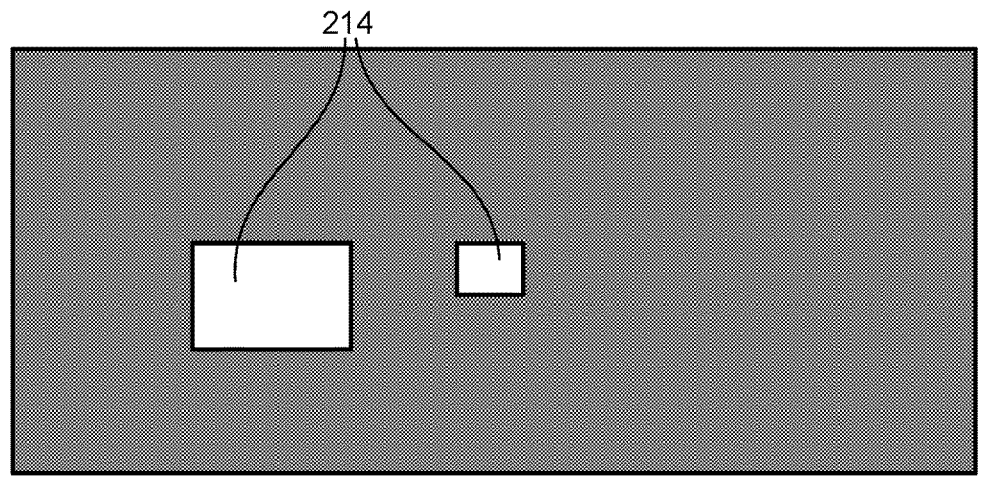
FIG. 3A-3C are example illustrations of ground truth segmentation masks corresponding to various semantic classes, in accordance with some embodiments of the present disclosure.
Figure 3B:
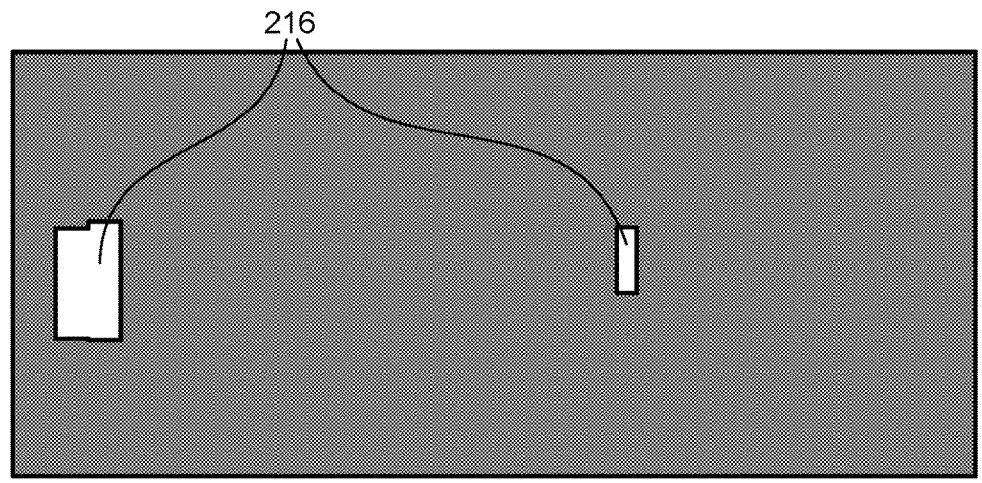
Figure 3C:
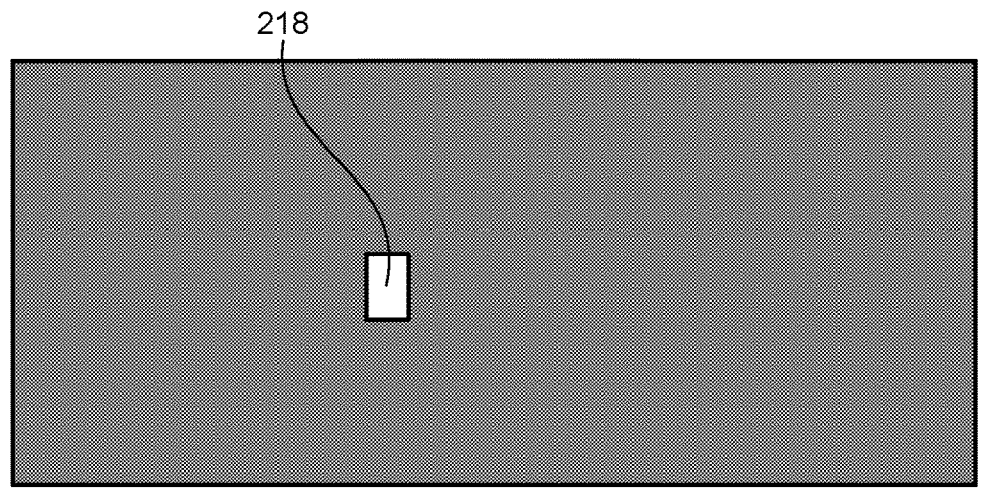

In some embodiments, the classes of interest may include "active vehicle", "rider", and "pedestrian." In non-limiting embodiments, each class can be represented as a binary mask encoded using a sigmoid function (or another function, as described herein) indicating confidence in a range (e.g., 0, 1) that a pixel belongs to certain class. Different classes may result in different segmentation masks 106, which may be identified in different colors or differentiated using other image processing or labeling methods, as illustrated in FIGS. 2 and 3A-3C. For example, FIG. 3A depicts a segmentation mask of each of the active vehicles 214, FIG. 3B depicts a segmentation mask of pedestrians 216, and FIG. 3C depicts a segmentation mask of the rider 218 (e.g., person on a bike and/or motorcycle) identified in the training image 210 of FIG. 2. As such, the annotations or labels may be used to generate ground truth segmentation masks for training the DNN(s) 104 to predict the segmentation masks corresponding to one or more classes of objects. In some embodiments, the training can advantageously be customized for different countries or regions to conform to regulations in that country or region, regarding when high beams should be on or off, dimmed or brightened, etc.

Once trained (or deployed), the DNN(s) 104 may receive the sensor data 102 as an input and output a confidence mask at each pixel for each class—which may be expressed as a sigmoid function, a step function, a linear function, hyperbolic tangent function, rectified linear unit (ReLU) function, and/or other function types. For example, the output of the DNN(s) 104 may be similar to the ground truth segmentation masks 106 depicted in FIGS. 3A-3C. To deal with resulting noise present in the output, a post-processor 108, as depicted in FIG. 1A, may execute various post-processing techniques. For example, the post-processor 108 may include a temporal filter 112 for temporal post-processing and/or a spatial filter 110 for spatial post-processing. As a non-limiting sequential example, raw predictions of the DNN(s) 104 may undergo tunable thresholding, followed by recursive Bayesian filtering (e.g., as a spatial filter), and finally may undergo temporal filtering. Furthermore, hysteresis gating can be applied in thresholding ON/OFF signals (e.g., some threshold number of similar or consistent results across frames may be required prior to adjusting control parameters of the high beams). In some embodiments, single-frame post-processing may be performed by thresholding to clip low confidence predictions using a maximum likelihood estimation (MLE). However, this technique throws away prior information from previous frames which may be helpful for generating more accurate results. As such, in some embodiments, a recursive Bayesian filter may be implemented as a maximum a posteriori (MAP) estimator to take advantage of prior information from previous frames or instances of the sensor data 102. In some embodiments, a motion-compensated recursive Bayesion filter algorithm may be used as an alternative or as an extension of a non-motion-compensated recursive Bayesion filter. For example, each pixel may maintain a motion vector, and a Bayesion filter applied on a next subsequent frame fetches values from the motion-compensated origin pixel in a previous frame.

According to one or more embodiments, tunable thresholding may be applied to the output segmentation masks. For example, probabilities may be used to predict each pixel's transition or change probability. Such transitions may refer to a pixels being relabeled from one frame to the next, such as from an active object label to a background label or the like. For non-limiting examples, where 1 corresponds to an active object and 0 corresponds to background, 0→1 may have a 15% (0.15) probability of occurring from one frame to the next, while 0→0 may have an 85% (0.85) chance of occurring from one frame to the next. Likewise, 1→1 may have a 95% (0.95) chance of occurring from one frame to the next, and 1→0 may have a 5% (0.05) chance of occurring from one frame to the next. Alternatively, spatial location (x,y) based statistics can be computed as a transition probability from ground truth data (e.g., via data mining), which may serve as a look up table for reference. For example, pixels in a top quarter of the frame may not transition from background pixels often (as they may more often correspond to the sky, or trees), while pixels in a middle region of the frame may be more likely to change from background to active object, or vice versa, as these regions may correspond to the driving surface or object thereon.

The spatial filter 110—such as a recursive Bayesian filter—may be applied to the segmentation masks 106 output by the DNN(s) 104 to weight confidence values across frames of the sensor data 102 (e.g., video image frames or the like). For example, the recursive Bayesian filter may take advantage of information from one or more previous frames when implemented as MAP or probability estimator. For example, the recursive Bayesian filter may receive input from the segmentation mask(s) 106 classifying pixels and also from a prior one of the segmentation mask(s) 106 classifying pixels of a prior image, where the prior segmentation mask(s) 106 was also weighted based on another prior segmentation mask(s), and so on. Since the output resolution of the DNN(s) 104 may be small (e.g., 120×76×3), estimation may be done independently at each pixel location. By estimating for each pixel independently, parallel processing may be employed using one or more parallel processing units (e.g., of a GPU(s)) for further optimization.

In some embodiments, temporal post-processing may be executed to reduce noise over time in view of one or more prior predictions. For example, N frame results may be maintained (e.g., in a rolling buffer) to reject outliers for a smoother result. As such, where a pixel is classified as an active object for three frames, then classified as background, and then classified again as an active object, the frame where the active object was classified as background may be rejected or updated (e.g., to reflect an active object). This may be the result of pixels not generally switching so quickly between classifications, and so the output of background may be filtered out as noise. In some embodiments, further or alternative post-processing can be performed, such as by using conditional random fields (CRF)/Markov random field (MRF), to leverage inter-pixel relationships for machine learning and structured predictions.

In some embodiments, hysteresis gating can be applied as a temporal filter to reduce reliance of the system on results that may be noisy. For example, ON/OFF signals may be thresholded such that some threshold number of similar or consistent results across frames may be required prior to adjusting control parameters of the high beams. As an example where a deactivation (or dimming) threshold is five, outputs for five consecutive instances of sensor data 102 indicating an actionable object is present at a particular region may be required before the high beam configuration is adjusted (globally or locally). Similarly, when (globally or locally) deactivated or dimmed, and an activation threshold of seven is implemented, outputs for seven consecutive instances of sensor data 102 indicating no actionable object is present at the particular region may be required before the high beam configuration is adjusted.

The segmentation masks 106—e.g., after post-processing via the post-processor 108—may be used by the mask generator 114 to generate instructions for the control components 120 to control the high beam configuration. Specifically, the mask generator 114 may include an illuminating mask 116 defined for certain classes, such as by generating 2D mapping from the camera or sensor location to the high beam mounting location to ensure the post-processed segmentation mask(s) 106 cause a shadow (e.g., blocking or turning off of light thereto) to be cast to a correct location in the environment. Based on the illuminating mask 116, control signals for the high beam configuration may be sent to the control components 120 controlling the high beam configuration. For traditional high beams, this may automatically turn the high beam configuration's lights on or off depending on detection of an active vehicle or other active object of interest and/or its estimated proximity based on the image processing described above.

However, for light emitted from a high beam LED light configuration, a dim region mask 118 may additionally or alternatively be used to cause various ones of the LEDs to be selectively brightened or dimmed (or turned off) by region using one or more microcontrollers or other ones of the control components 120. For example, in an ADB high beam configuration, some LEDs in an array of LEDs may be turned off or otherwise blocked to create a shadow on an area in front of the high beams where an active vehicle was detected, as in the environment illustrated in FIGS. 4A, 4B, and FIG. 5.

As an example, and with reference to FIG. 4A, raw segmentation mask 410 (which may correspond to a combination of segmentations masks for different classes) may be output by the DNN(s) 104 based on input sensor data 102 representative of image 402 of visualization 400A. The raw segmentation mask 410 may undergo one or more post-processing steps to generate filtered segmentation mask 412. The filtered segmentation mask may then be used to generate a mask 422 (FIG. 4B). The visualization 400A may represent the results from the filtered segmentation mask 412 overlaid on the image 402. For example, the filtered segmentation masks 412 may be used to identify locations of active vehicles 214, pedestrians 216, cyclists or riders 218, and/or other road actors, and/or to parked/inactive vehicles 220.

With reference to FIG. 4B, the filtered segmentation mask 412 may be used to determine a raw dim region mask 420 which may indicate the portions of the image 402 that correspond to actionable actors—e.g., actors for which the high beams should be dimmed or turned off. The raw dim region mask 420 may then be processed to determine each of the regions of the image 402 where the high beams should be dimmed or turned off, which may include the regions beyond the actors and in front of the actors. As a result, the filtered dim region mask 422 may be generated, where the filtered dim region mask 422 indicates unlit portions 430 of the image 402 and lit portions 432 of the image 402. Visualization 400B of FIG. 4B may represent the filtered dim region mask 422 (or illuminating mask) overlaid on the image 402.

Figure 5:
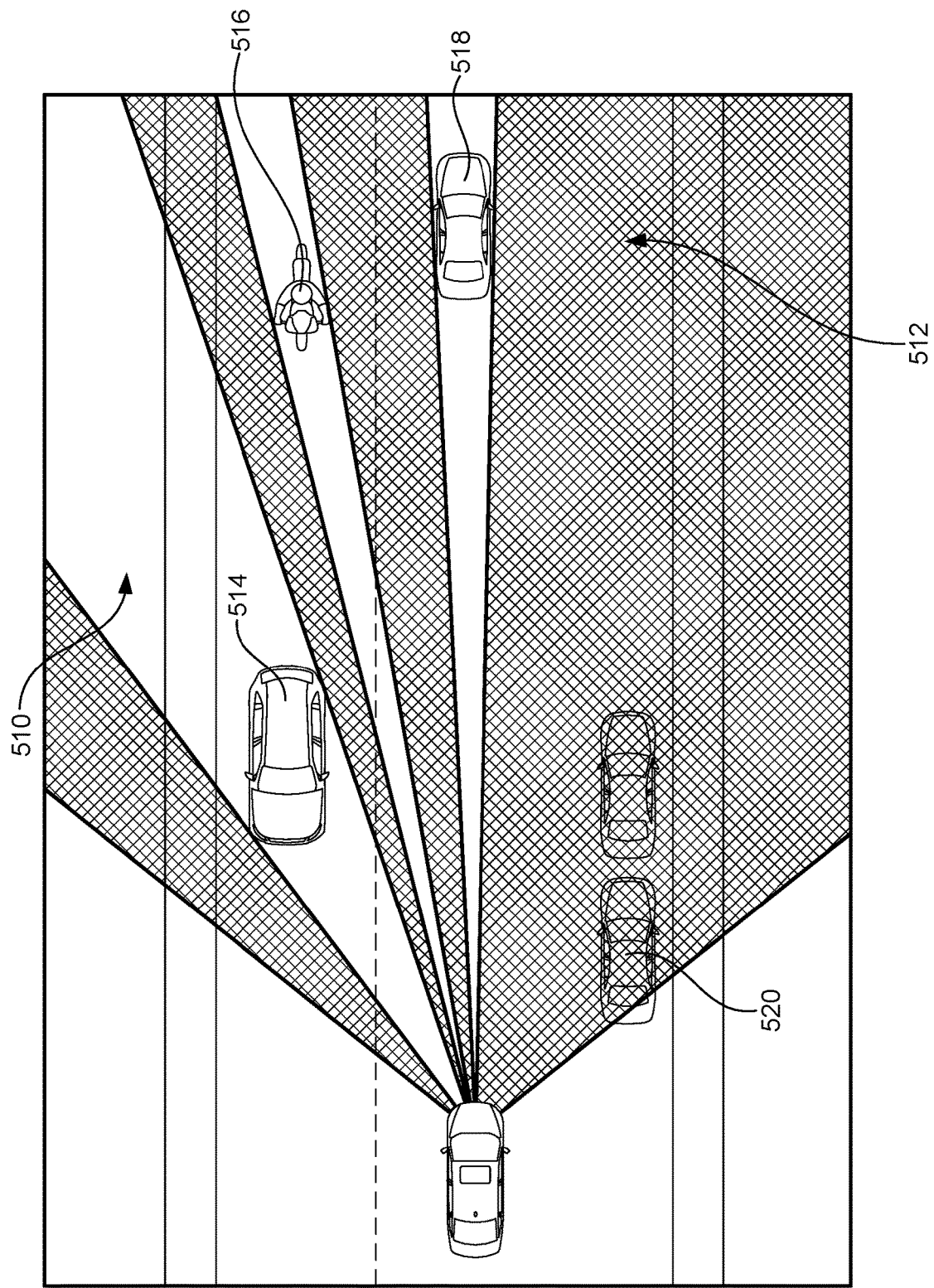
FIG. 5 is an example illustration of an environment where a high beam control configuration dims portions of light beams corresponding to active vehicles, in accordance with some embodiments of the present disclosure.

As another example and with respect to FIG. 5, FIG. 5 depicts lit portions 512 (e.g., corresponding to lit portions 432 of the image 402) of the environment and unlit or dimmed portions 510 (e.g., corresponding to unlit portions 430 of the image 402) of the environment where the light beam is turned off or blocked. Specifically, the segmentation masks are used to identify active vehicles or other items such as riders that should fall within the unlit or dimmed portions 510, and which ones should fall within the lit portions 512. For example, oncoming vehicle 514 may be identified as an active vehicle and motorcyclist 516 may be identified as a rider, as described above. In some aspects, leading vehicles 518 may be identified via their tail lights and, within a certain proximity to the high beam configuration or sensor collecting the sensor data 102, may likewise be identified as active vehicles. Any inactive vehicles (such as parked vehicles 520) identified via the segmentation masks may be ignored by the systems described herein, such that these parked/inactive vehicles may remain in the lit portions 512 of the environment.

Because the sensors described herein may not be directly aligned with the high beam configuration or the lights thereof, some mapping between the locations to be lit in the environment (as detected by sensors here) and the high beam configuration or the lights thereof may be required. This may be accomplished during training using operator input or based on a pre-determined difference in distance between the sensors used to gather the sensor data 102 and the high beam configuration or the lights thereof. For example, on/off masks or illumination masks depicted in FIG. 4B may be mapped to corresponding lights or LEDs to generate the beam pattern displayed in FIG. 5.

Once the active vehicle is no longer detected, all of the LEDs in the array of LEDs may be turned back on or no longer be blocked. Note that, because the sensor or camera mounting location on the vehicle may not be at a same location as the lights of the high beams, these image processing steps may also include mapping from the detection location of the labeled regions to an actual high-beam projection location, so that blocking or dimming of high beams is accurately applied.

In some high beam configurations, even if arrays of LEDs are not used, other techniques may be used to create shadows or lower illumination levels over desired areas or regions of an environment to the front or side of the vehicle. For example, if each of two high beam lights have motor controls, those motor controls can receive commands to move the lights left, right, up, or down. Likewise, both lights could be actuated outward to create a central layer or a gap causing a shadow between the two beams. As such, numerous methods of creating shadows over areas of the road based on results of the DNN(s) 104 and/or post-processing described herein may be used to automatically control when, how, and where the high beam light shines.

The control components 120 may include the beam configuration and/or any controllers for adjusting or managing control parameters or settings of the beam configuration. Specifically, the control components 120 may include on/off switches, diming/brightening switches, actuators, motors, and/or the like. For example, the beam configuration may include one or more high beam headlights or one or more low beam headlights operable to turn off and turn on, to be selectively dimmed or brightened, and/or to have a pose corresponding thereto adjusted (e.g., by actuating the beams or lights thereof using one or more motors). Some embodiments of the high beam headlight configuration may include an array or matrix of beam light emitting diodes (LEDs) independently dimmable or independently operable to be selectively turned off or on. Additionally or alternatively, some embodiments of the beam configuration may include motors configured and operable for actuating at least one high beam light of the beam configuration. For example, the motor may selectively pivot the at least one high beam light to shine further left, further right, further up, further down, or a combination thereof.

Figure 6:
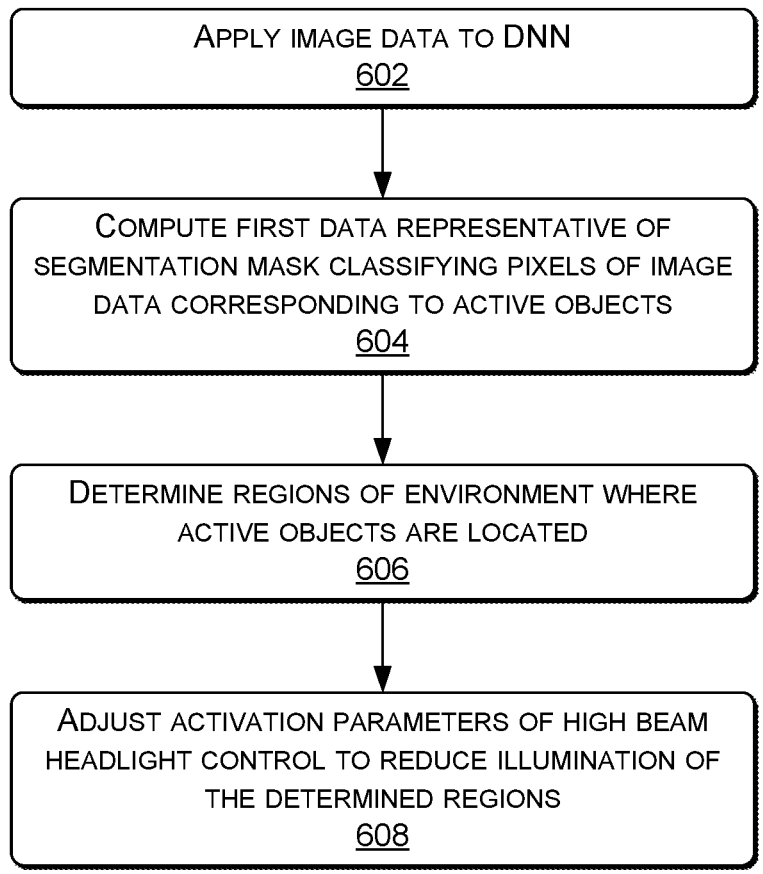
FIGS. 6-8 are flow diagrams showing methods for automatically controlling high beam configurations using outputs from a DNN, in accordance with some embodiments of the present disclosure.
Figure 7:
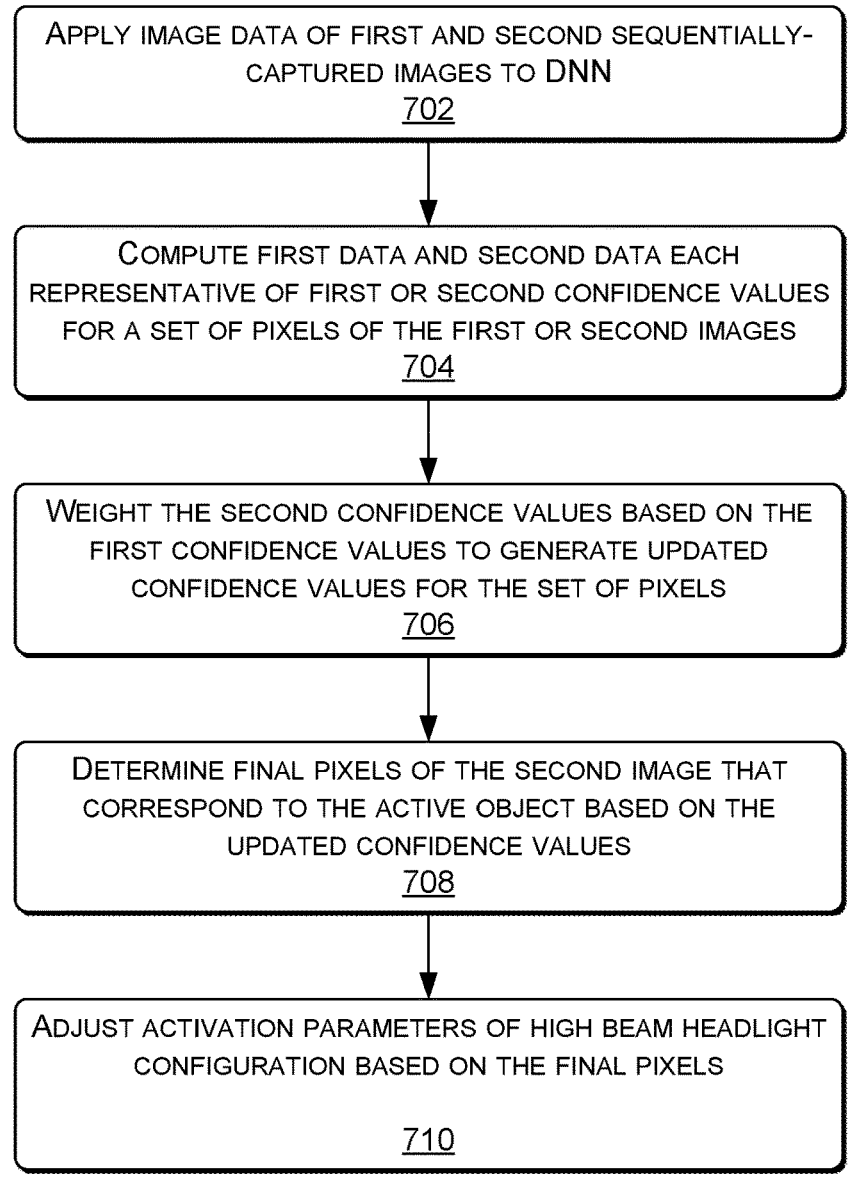
Figure 8:
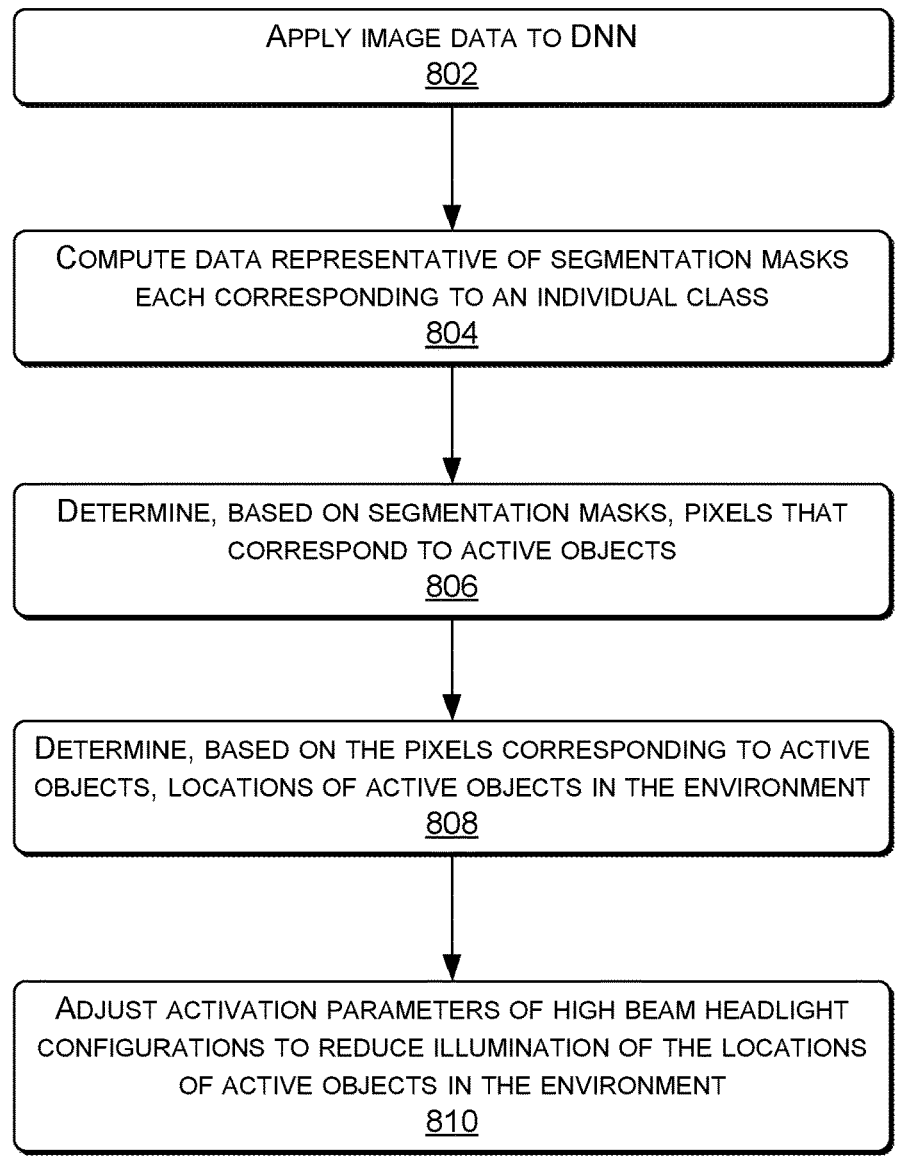

Now referring to FIGS. 6-8, each block of methods 600, 700, and 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 600, 700, and 800 are described, by way of example, with respect to the process 100 of FIG. 1. However, these methods may additionally or alternatively be executed by any one system, or any combination of systems, including, but not limited to, those described herein.

Now referring to FIG. 6, FIG. 6 is a flow diagram showing a method 600 for automatic control of a high beam configuration, in accordance with some embodiments of the present disclosure. The method 600, at block B602, includes applying image data to a DNN, such as the DNN 104 described herein. The image data may be any of the sensor data 102 described above and may be representative of an image of an environment, in some embodiments.

The method 600, at block B604, includes computing first data representative of a segmentation mask classifying pixels of the image that correspond to one or more active objects, such as the active vehicles 214 described above. This computing may be accomplished using the training data obtained using various techniques described herein. In some embodiments, the pixels classified in block 604 are further processed via the post-processor 108. For example, the spatial filter such as the recursive Bayesian filter 110 may be applied to the first data, such that the segmentation mask classifying the pixels are weighted based on other values from one or more prior images. Specifically, the recursive Bayesian filter 110 may receive the first data and second data representative of one or more prior segmentation masks classifying respective pixels of the one or more prior images that correspond to the one or more active objects.

The method 600, at block B606, includes determining one or more regions of the environment where the one or more active objects are located. This determining may be accomplished based at least in part on the pixels classified in block B604 above and may, in some embodiments, be accomplished via the illuminating mask 116 and/or the dim region mask 118 depicted in FIG. 1A.

The method 600, at block B608, includes adjusting control parameters of a beam configuration (such as a high beam headlight configuration for example and without limitation) to reduce illumination of the one or more regions determined in block B606 above. The control parameters may correspond to turning on and/or turning off the beam configuration corresponding to the one or more regions of the environment where the one or more active objects are located. Additionally or alternatively, the control parameters may correspond to dimming and/or turning off select light emitting diodes (LEDs) of a plurality of LEDs of the beam configuration. Specifically, the select LEDs of the plurality of LEDs may be ones that are determined to correspond to the one or more regions of the environment where the one or more active objects are located. In yet another alternative embodiment, the control parameters may correspond to actuation settings for one or more motors configured for angling or directing lights of the beam configuration. Specifically, the actuation settings may cause actuation of one or more of the lights of the beam configuration away from a direction corresponding to the one or more regions of the environment where the one or more active objects are located.

With reference to FIG. 7, FIG. 7 is a flow diagram showing a method 700 for automatic control of a high beam configuration, in accordance with some embodiments of the present disclosure. The method 700, at block B702, includes applying image data to a DNN, such as the DNN 104 described herein. The image data may be any of the sensor data 102 described above and may be representative of a first image and of a second image captured sequentially after the first image.

The method 700, at block B704, includes computing first data representative of first confidence values for a set of pixels of the first image corresponding to an active object (e.g., the active vehicle 214) and second data representative of second confidence values for the set of pixels of the second image. This computing may be accomplished using the DNN 104 based at least in part on the image data applied thereto.

The method 700, at block B706, includes weighting the second confidence values based at least in part on the first confidence values to generate updated confidence values for the set of pixels corresponding to the active object. This weighting may be iterative or recursive for each successive image or frame. For example, prior to the weighting the second confidence values, the first confidence values may be weighted based at least in part on other confidence values from one or more prior images. As described above, following DNN processing to generate the segmentation masks, various post-processing techniques may also be executed.

The method 700, at block B708, includes determining final pixels of the second image that correspond to the active object based at least in part on the updated confidence values. For example, in some embodiments this may be accomplished via the illuminating mask 116 and/or the dim region mask 118 as depicted in FIG. 1A.

The method 700, at block B710, includes adjusting control parameters of the beam configuration to reduce illumination of one or more regions of an environment based at least in part on the final pixels. This may be accomplished, for example, using the mask generator 114 depicted in FIG. 1. The control parameters may be output to the control components 120 as described above. For example, the control parameters may correspond to turning on and/or turning off the beam configuration corresponding to the one or more regions of the environment where the one or more active objects are located. Additionally or alternatively, the control parameters may correspond to dimming and/or turning off select light emitting diodes (LEDs) of a plurality of LEDs of the beam configuration. Specifically, the select LEDs of the plurality of LEDs may be ones that are determined to correspond to the one or more regions of the environment where the one or more active objects are located. In yet another alternative embodiment, the control parameters may correspond to actuation settings for one or more motors configured for angling or directing lights of the beam configuration. Specifically, the actuation settings may cause actuation of one or more of the lights of the beam configuration away from a direction corresponding to the one or more regions of the environment where the one or more active objects are located.

Now referring to FIG. 8, FIG. 8 is a flow diagram showing a method 800 for automatic control of a beam configuration, in accordance with some embodiments of the present disclosure. The method 800, at block B802, includes applying image data to a DNN, such as the DNN 104 described herein. The image data may be any of the sensor data 102 described above and may be representative of an image of an environment generated using any image sensor described herein.

The method 800, at block B804, includes computing data representative of one or more segmentation masks. Each of the segmentation masks may correspond to an individual class (e.g., a vehicle class, an active vehicle class, or the like). This computing may be accomplished using the DNN 104 and may be based at least in part on the image data applied thereto. In some embodiments, such computing may additionally include post-processing as described herein. For example, a filter such as the recursive Bayesian filter 110 may be applied to the segmentation masks to weight the segmentation masks based at least in part on prior segmentation masks computed by the DNN 104 based at least in part on prior images, as described above.

The method 800, at block B806, includes determining pixels that correspond to one or more active objects (e.g., the active vehicles 214) based at least in part on the segmentation masks. For example, in some embodiments, this may be accomplished using the mask generator 114 (e.g., the illuminating mask 116 and/or the dim region mask 118). Furthermore, the method 800, at block 808, includes determining one or more locations of the one or more active objects in the environment based at least in part on the pixels determined in block 806.

The method 800, at block B810, includes adjusting control parameters of the beam configuration to reduce illumination of the one or more locations of active objects in the environment. This adjusting of the control parameters may be accomplished, for example, using the mask generator 114 depicted in FIG. 1. The control parameters may be output to the control components 120 as described above. For example, the control parameters may correspond to turning on and/or turning off the beam configuration corresponding to illuminating of the one or more regions of the environment where the one or more active objects are located. Additionally or alternatively, the control parameters may correspond to dimming and/or turning off select light emitting diodes (LEDs) of a plurality of LEDs of the high beam headlight configuration. Specifically, the select LEDs of the plurality of LEDs may be ones that are determined to correspond to illuminating the one or more regions of the environment where the one or more active objects are located. In yet another alternative embodiment, the control parameters may correspond to actuation settings for one or more motors configured for angling or directing lights of the beam configuration. Specifically, the actuation settings may cause actuation of one or more of the lights of the beam configuration away from a direction corresponding to illuminating of the one or more regions of the environment where the one or more active objects are located.

Example Autonomous Vehicle

Figure 9A:
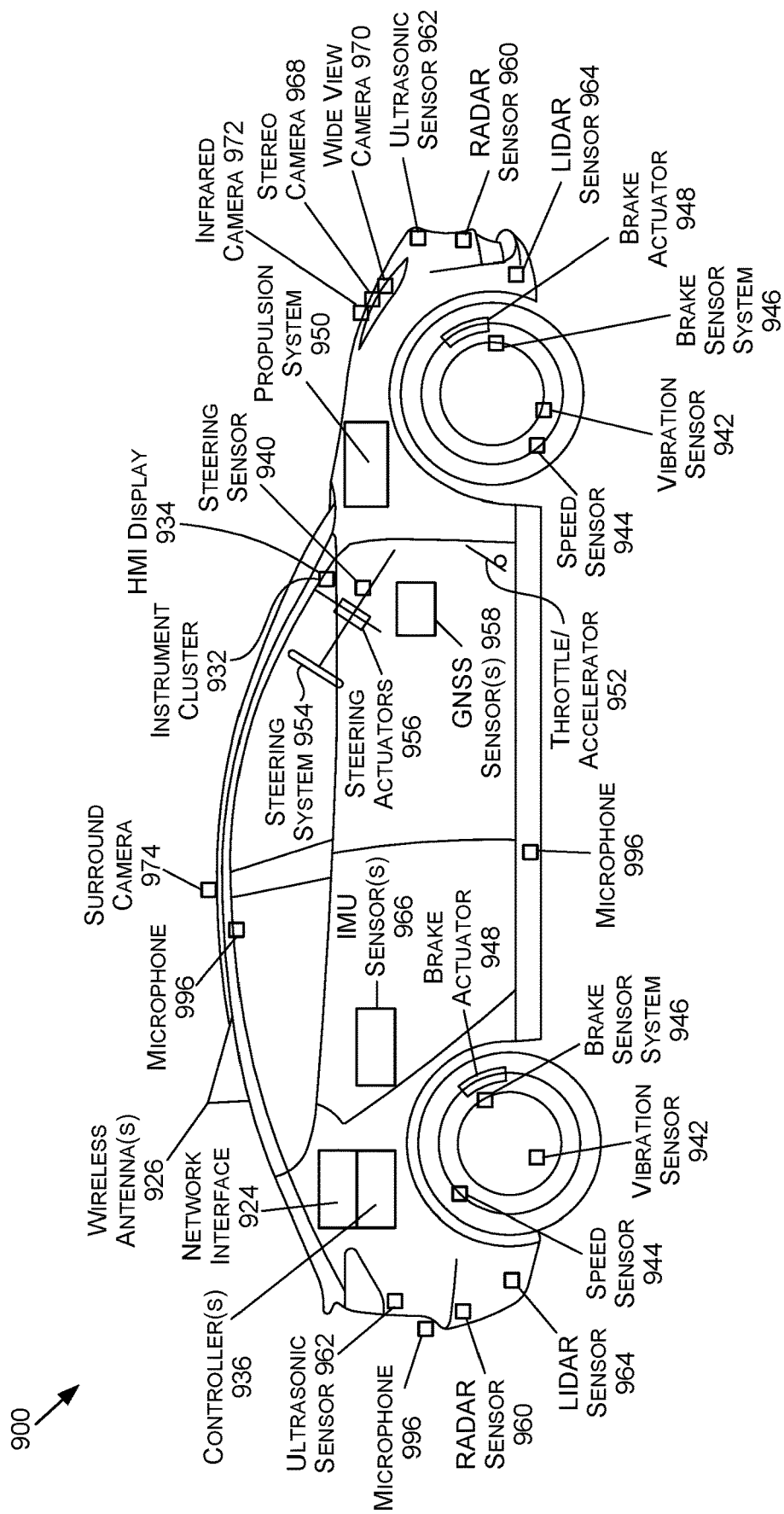
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. For example, the vehicle 900 may be capable of conditional automation (Level 3), high automation (Level 4), and/or full automation (Level 5), depending on the embodiment.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. The controller(s) 936 may, in some embodiments, implement the DNN(s) 104 described herein, as well as the post-processor 108 and the mask generator 114. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the HD map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). Furthermore, the HMI display 934 may display information about the high beam headlight configuration and control thereof as described herein.

The vehicle 900 further includes a network interface 924 which may use one or more wireless antenna(s) 926 and/or modem(s) to communicate over one or more networks. For example, the network interface 924 may be capable of communication over LTE, WCDMA, UMTS, GSM, CDMA2000, etc. The wireless antenna(s) 926 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 9B:
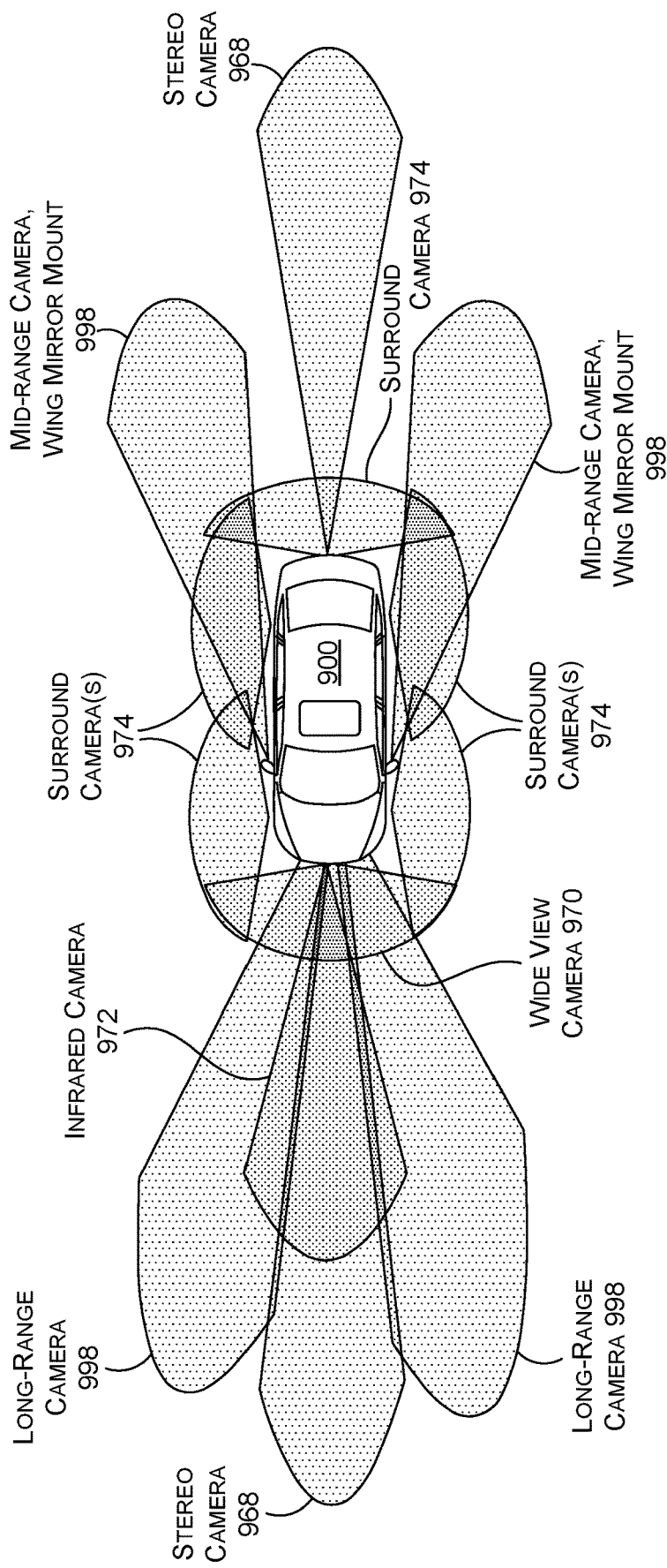
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control, such as the automatic high beam control described herein. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may any number of wide-view cameras 970 on the vehicle 900. In addition, long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

One or more stereo cameras 968 may also be included in a front-facing configuration. The stereo camera(s) 968 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image.

An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
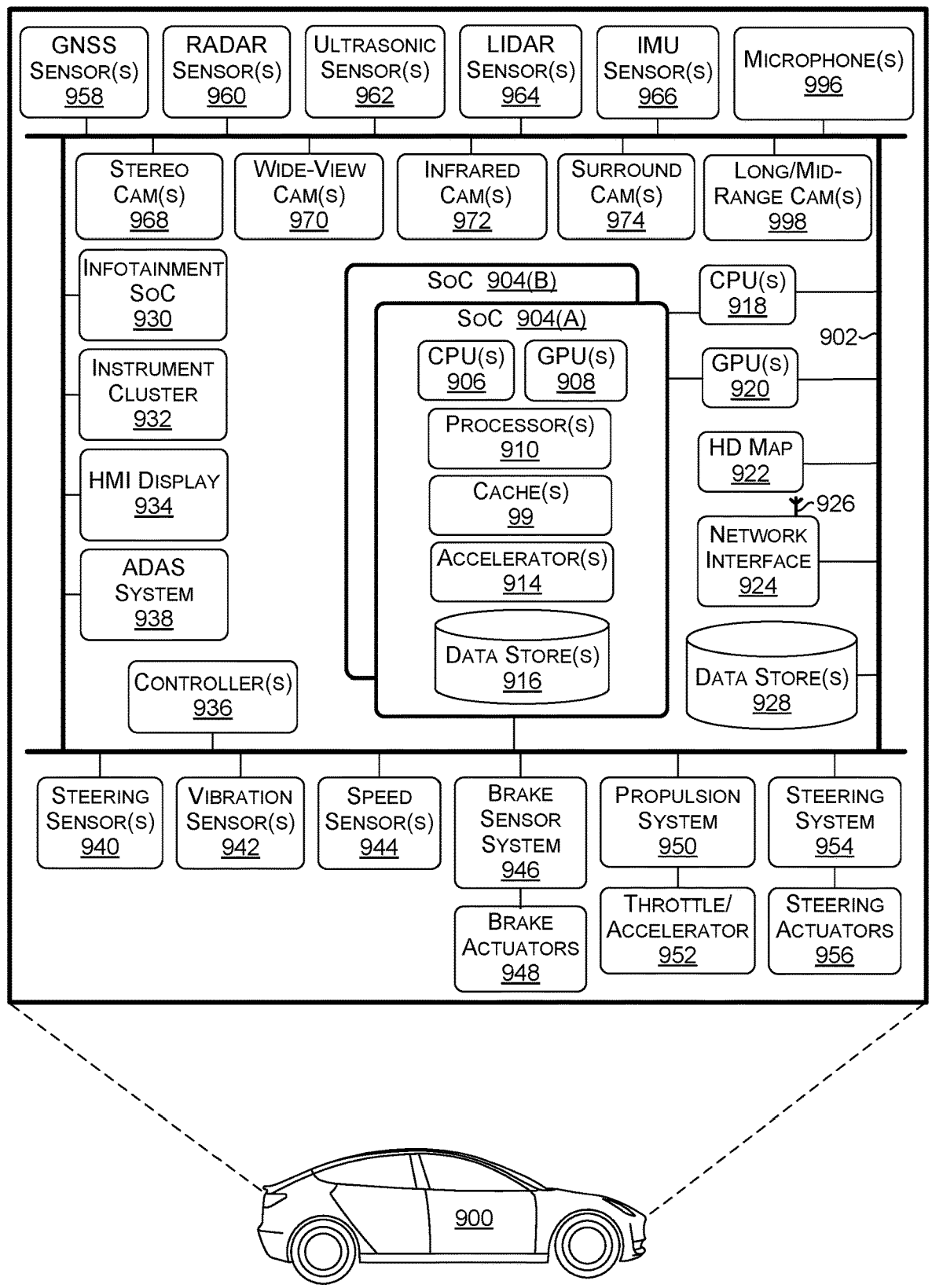
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions, including but not limited to the automatic high beam control functions described herein. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks (e.g., DNN 104), especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network (e.g., DNN 104) that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926

(e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
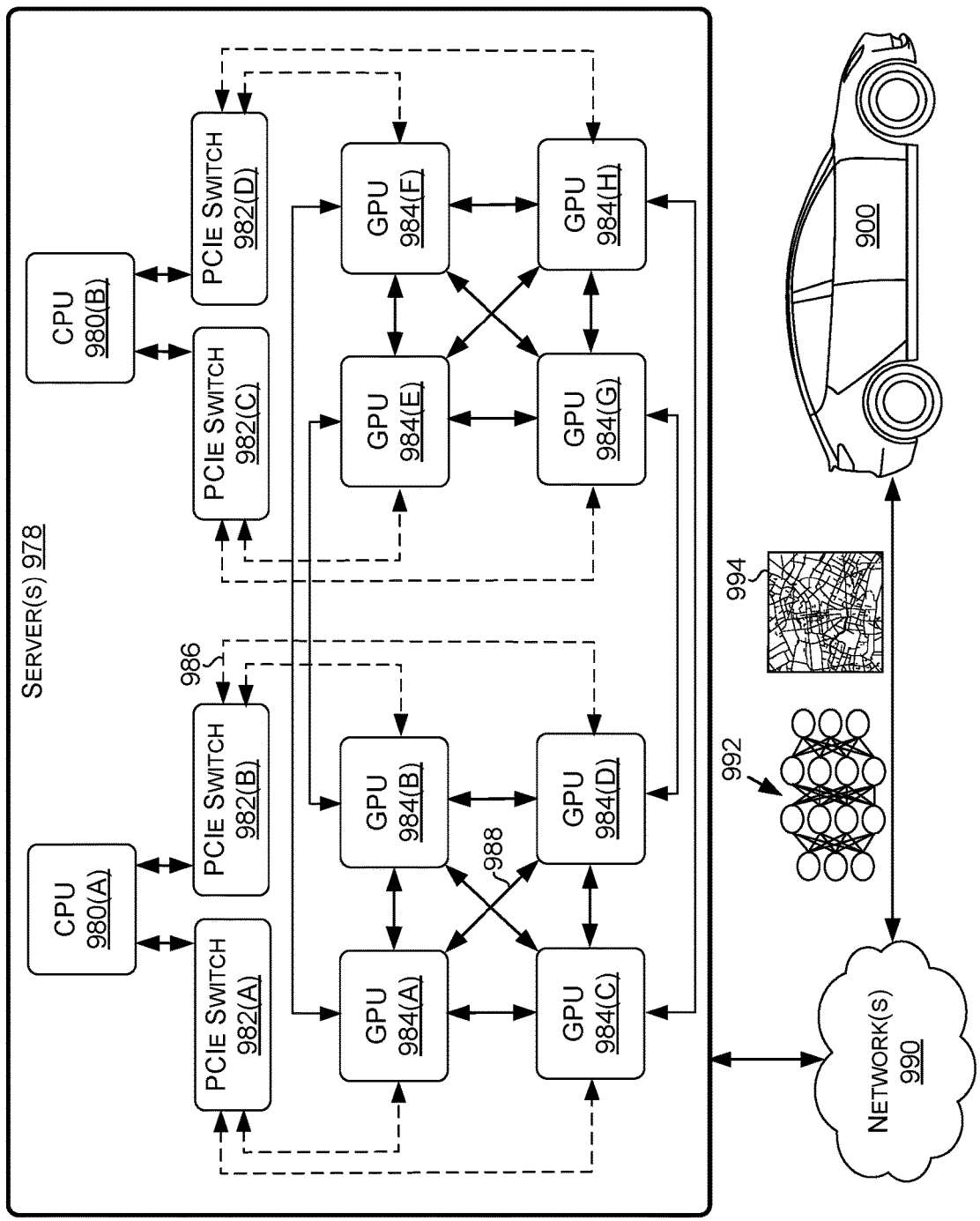
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., DNN104) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
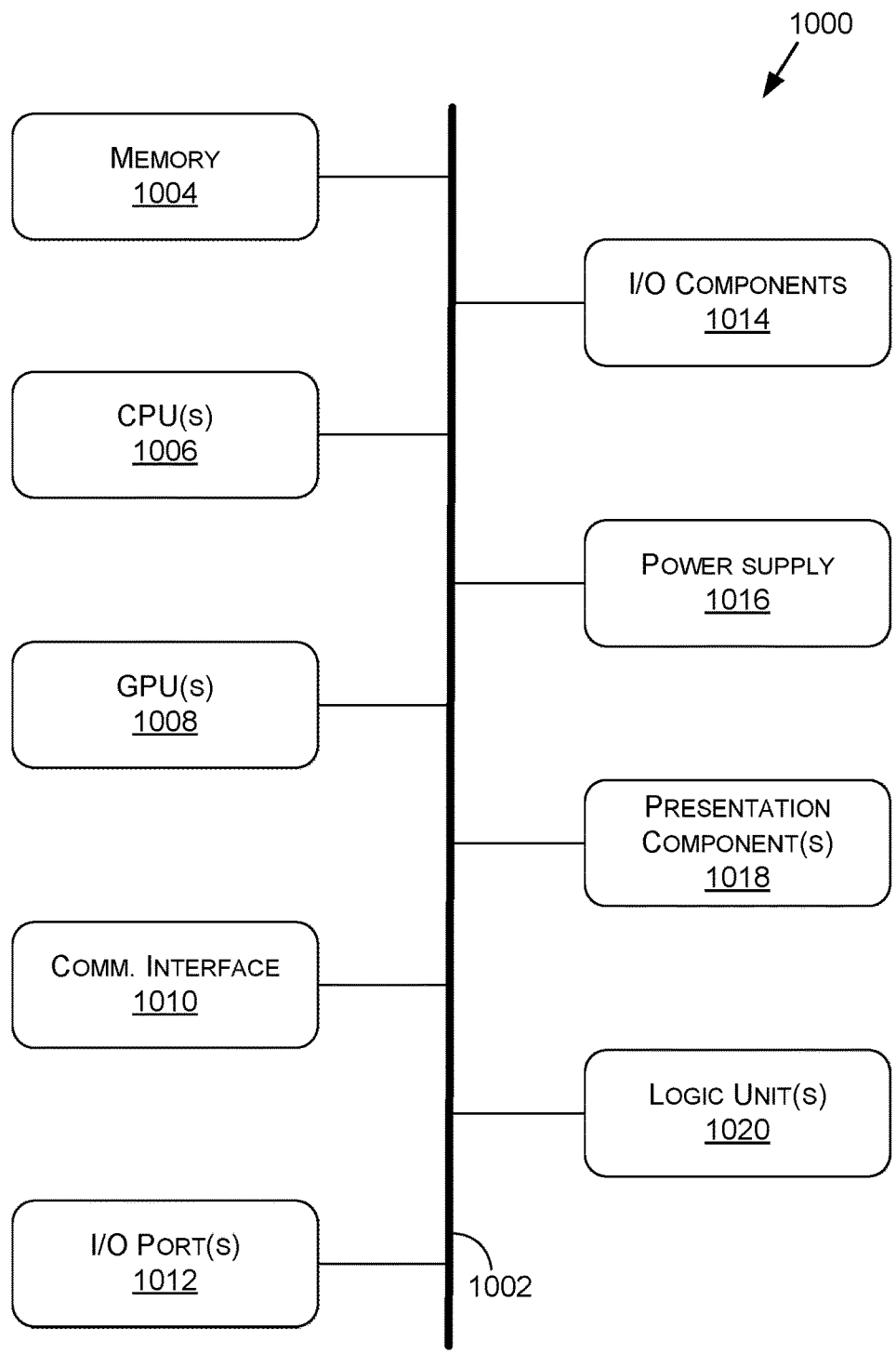
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like. The logic unit(s) may also include one or more components of the control components 120 for controlling when and where high beam light is provided by the high beam configuration of the vehicle.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

Example Data Center

Figure 11:
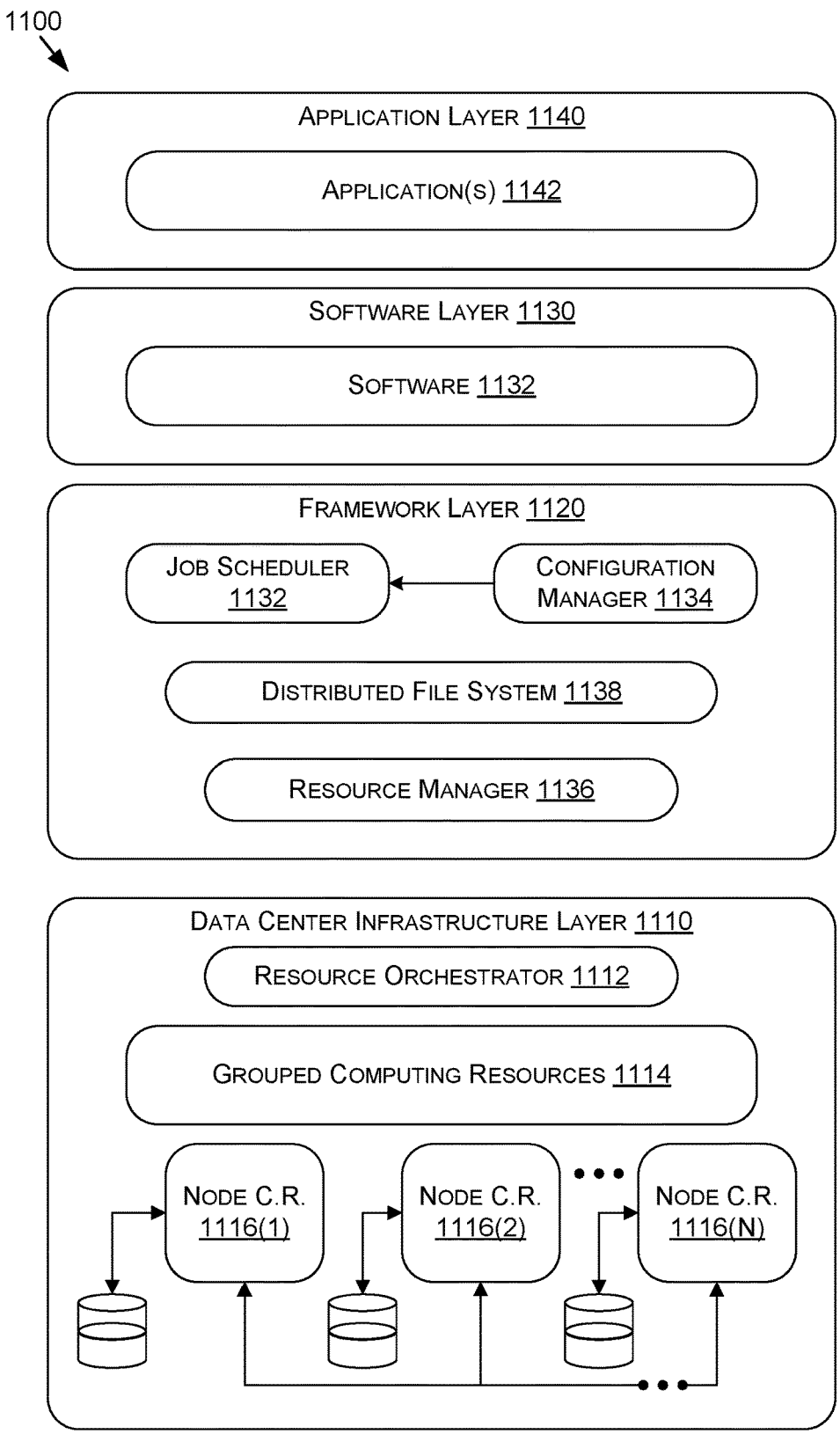
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1122 may configure or otherwise control one or more node C.R.s 1116(1)-1116(N) and/or grouped computing resources 1114. In at least one embodiment, resource orchestrator 1122 may include a software design infrastructure ("SDI") management entity for the data center 1100. The resource orchestrator 1122 may include hardware, software, or some combination thereof.

In at least one embodiment, as shown in FIG. 11, framework layer 1120 may include a job scheduler 1132, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1132 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1132. In at least one embodiment, clustered or grouped computing resources may include grouped computing resource 1114 at data center infrastructure layer 1110. The resource manager 1036 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
applying, to a neural network (NN), image data representative of an image of an environment;
computing, using the NN and based at least in part on the image data, first data representative of a segmentation mask classifying pixels of the image as corresponding to one or more active objects;
determining, based at least in part on the pixels, one or more regions of the environment where the one or more active objects are located; and
adjusting control parameters of a beam configuration to reduce illumination of the one or more regions.

2. The method of claim 1, further comprising applying a spatial filter to the first data prior to the determining, wherein the segmentation mask is weighted based on other values corresponding to one or more prior images.

3. The method of claim 2, wherein the spatial filter is a recursive Bayesian filter that receives, as input, the first data and second data representative of one or more prior segmentation masks classifying respective pixels of the one or more prior images that correspond to the one or more active objects.

4. The method of claim 1, wherein the control parameters correspond to at least one of turning on or turning off the beam configuration corresponding to the one or more regions of the environment where the one or more active objects are located.

5. The method of claim 1, wherein the control parameters correspond to at least one of dimming or turning off select light emitting diodes (LEDs) of a plurality of LEDs of the beam configuration, the select LEDs of the plurality of LEDs determined to correspond to the one or more regions of the environment where the one or more active objects are located.

6. The method of claim 1, wherein the control parameters correspond to actuation settings for one or more motors configured for angling or directing lights of the beam configuration, wherein the actuation settings cause actuation of one or more of the lights of the beam configuration away from a direction corresponding to the one or more regions of the environment where the one or more active objects are located.

7. The method of claim 1, further comprising applying a temporal filter to the first data prior to the determining.

8. A method comprising:
applying image data representative of a first image and a second image captured sequentially;
computing, based at least in part on the image data, first data representative of first confidence values for a set of pixels of the first image corresponding to an active object and second data representative of second confidence values for the set of pixels of the second image;

weighting the second confidence values based at least in part on the first confidence values to generate updated confidence values for the set of pixels;

determining final pixels of the second image that correspond to the active object based at least in part on the updated confidence values; and adjusting control parameters of a beam configuration to reduce illumination of one or more regions of an environment determined based at least in part on the final pixels.

9. The method of claim 8, wherein, prior to the weighting the second confidence values, the first confidence values are weighted based at least in part on other confidence values from one or more prior images.

10. The method of claim 8, wherein the control parameters correspond to at least one of turning on or turning off of the beam configuration corresponding to the one or more regions of the environment determined based at least in part on the final pixels.

11. The method of claim 8, wherein the control parameters correspond to at least one of dimming or turning off select light emitting diodes (LEDs) of a plurality of LEDs of the beam configuration, the select LEDs of the plurality of LEDs determined to correspond to the one or more regions of the environment determined based at least in part on the final pixels.

12. The method of claim 8, wherein the control parameters correspond to actuation settings for one or more motors configured for angling or directing lights of the beam configuration, wherein the actuation settings cause actuation of one or more of the lights of the beam configuration away from a direction corresponding to the one or more regions of the environment determined based at least in part on the final pixels.

13. The method of claim 8, wherein the weighting of the second confidence values is performed by applying the first data and the second data to a recursive Bayesian filter.

14. The method of claim 8, further comprising applying the first data and the second data to a temporal filter that adjusts the first data and the second data using hysteresis gating.

15. A system comprising:
an image sensor;
a beam configuration; and
one or more processors to execute operations comprising:
applying, to a neural network (NN), image data representative of an image of an environment generated using the image sensor;

computing, using the NN and based at least in part on the image data, data representative of one or more segmentation masks, each segmentation mask of the one or more segmentation masks corresponding to an individual class;

determining, based at least in part on the one or more segmentation masks, pixels that correspond to one or more active objects;

determining, based at least in part on the pixels, one or more locations of the one or more active objects in the environment; and adjusting control parameters of the beam configuration to reduce illumination of the one or more locations.

16. The system of claim 15, wherein the operations are further comprising: applying a recursive Bayesian filter to the one or more segmentation masks to weight the one or more segmentation masks based at least in part on one or more prior segmentation masks computed by the NN based at least in part on one or more prior images.

17. The system of claim 15, wherein the operations are further comprising: applying a single-frame post-processing filter to the one or more segmentation masks, wherein the single-frame post-processing filter clips low confidence predictions using a maximum likelihood estimation (MLE).

18. The system of claim 15, wherein the control parameters correspond to at least one of turning on or turning off one or more lights of the beam configuration corresponding to illuminating of one or more regions of the environment where the one or more active objects are located.

19. The system of claim 15, wherein the control parameters correspond to at least one of dimming or turn off select light emitting diodes (LEDs) of a plurality of LEDs of the beam configuration, wherein the select LEDs of the plurality of LEDs determined to correspond to illuminating of one or more regions of the environment where the one or more active objects are located.

20. The system of claim 15, wherein the control parameters correspond to actuation settings for one or more motors configured for angling or directing lights of the beam configuration, wherein the actuation settings cause actuation of one or more of the lights of the beam configuration away from a direction corresponding to illuminating of one or more regions of the environment where the one or more active objects are located.

* * * * *